(12) United States Patent  
Bailey

(10) Patent No.: US 11,209,333 B2  
(45) Date of Patent: Dec. 28, 2021

(54) FLOW DETECTION DEVICE

(71) Applicant: HomeServe plc, Walsall (GB)

(72) Inventor: Samuel Bailey, London (GB)

(73) Assignee: HomeServe plc, Walsall (GB)

( * ) Notice: Subject to any disclaimer, the term of this patent is extended or adjusted under 35 U.S.C. 154(b) by 155 days.

(21) Appl. No.: 16/027,831

(22) Filed: Jul. 5, 2018

(65) Prior Publication Data

US 2018/0313714 A1 Nov. 1, 2018

Related U.S. Application Data

(63) Continuation of application No. 15/541,856, filed as application No. PCT/GB2016/050021 on Jan. 6, 2016, now Pat. No. 10,704,979.

(30) Foreign Application Priority Data

Jan. 7, 2015 (GB) ..................... 1500174

(51) Int. Cl.  
*G01K 13/02* (2021.01)  
*G01M 3/00* (2006.01)  
(Continued)

(52) U.S. Cl.  
CPC ............. *G01M 3/002* (2013.01); *G01K 1/143* (2013.01); *G01K 13/02* (2013.01); *G01M 3/2807* (2013.01); *G01P 13/006* (2013.01); *G01K 13/026* (2021.01); *G01M 3/243* (2013.01); *G01M 3/3254* (2013.01)

(58) Field of Classification Search  
CPC ...... G01N 25/72; G01N 25/18; G01N 17/008; G01N 21/952; G01N 2291/02836; G01M 3/2807; G01M 99/002; G01M 3/002; G01M 3/243; G01M 3/26; G01M 3/3254; G01M 5/0033; G01M 13/02; G01M 13/026; G01M 15/007; G01M 1/143; G01K 17/00; G01K 1/143; G01K 2013/026; G01K 13/00;  
(Continued)

(56) References Cited

U.S. PATENT DOCUMENTS 3,366,942 A    1/1968   Deane  
3,425,277 A    2/1969   Adams  
(Continued)

FOREIGN PATENT DOCUMENTS

CN    101839795 A    9/2010  
CN    102753944 A    10/2012  
(Continued)

OTHER PUBLICATIONS

"Leak Detection and Automatic Refrigerant Pump Down," Panasonic, 5 pages, found to be available on Nov. 24, 2015, retrieved from http://aircon.panasonic.eu/GB_en/happening.  
(Continued)

*Primary Examiner* — Gail Kaplan Verbitsky  
(74) *Attorney, Agent, or Firm* — Sterne, Kessler, Goldstein & Fox P.L.L.C.

(57) ABSTRACT

A flow detector for detecting flow rates of fluid in pipes by measuring the temperature of the pipe and the ambient temperature and determining from the signals whether there is a flow in the pipe, by the shape of the temperature signals without providing any heat input to the pipe or fluid.

20 Claims, 15 Drawing Sheets

(51) Int. Cl.
  *G01M 3/28* (2006.01)
  *G01P 13/00* (2006.01)
  *G01K 1/143* (2021.01)
  G01M 3/32 (2006.01)
  G01M 3/24 (2006.01)

(58) Field of Classification Search
  CPC . G01K 11/24; G01K 3/04; G01K 3/06; G01K 13/02; G01K 13/026; G01P 13/006
  USPC .......................................................... 702/51
  See application file for complete search history.

(56) References Cited

U.S. PATENT DOCUMENTS

| | | | |
|---|---|---|---|
| 3,438,254 A | 4/1969 | Seeley | |
| 3,570,310 A | 3/1971 | Densmore | |
| 3,830,104 A | 8/1974 | Gau | |
| 3,874,222 A | 4/1975 | Ladd et al. | |
| 3,938,384 A | 2/1976 | Blair | |
| 4,067,237 A | 1/1978 | Arcella | |
| 4,255,968 A | 3/1981 | Harpster | |
| 4,295,669 A | 10/1981 | LaPrade et al. | |
| 4,308,746 A | 1/1982 | Covington | |
| 4,319,483 A | 3/1982 | Durham, Jr. et al. | |
| 4,335,605 A | 6/1982 | Boyd | |
| 4,336,708 A * | 6/1982 | Hobgood | G01M 3/18 374/5 |
| 4,339,949 A | 7/1982 | Bahner et al. | |
| 4,349,282 A | 9/1982 | Norfolk | |
| 4,363,221 A | 12/1982 | Singh | |
| 4,400,975 A | 8/1983 | McGarr | |
| 4,418,568 A | 12/1983 | Surman | |
| 4,440,021 A | 4/1984 | Abouchar et al. | |
| 4,480,467 A | 11/1984 | Harter et al. | |
| 4,484,471 A | 11/1984 | Swithenbank et al. | |
| 4,494,112 A | 1/1985 | Streib | |
| 4,495,488 A | 1/1985 | Streib | |
| 4,519,246 A | 5/1985 | Hartemink | |
| 4,548,516 A | 10/1985 | Helenowski | |
| 4,599,895 A | 7/1986 | Wiseman | |
| 4,608,857 A | 9/1986 | Mertens et al. | |
| 4,609,292 A | 9/1986 | Asano et al. | |
| 4,633,578 A | 1/1987 | Aine et al. | |
| 4,637,253 A | 1/1987 | Sekimura et al. | |
| 4,690,570 A | 9/1987 | Wall | |
| 4,750,189 A | 6/1988 | Lancaster et al. | |
| 4,796,466 A | 1/1989 | Farmer | |
| 4,843,881 A | 6/1989 | Hubbard | |
| 4,876,887 A | 10/1989 | Mickler | |
| 4,922,233 A | 5/1990 | Twerdochlib | |
| 4,938,079 A | 6/1990 | Goldberg | |
| 4,942,763 A | 7/1990 | Harpster | |
| 4,962,765 A * | 10/1990 | Kung | A61B 5/01 600/549 |
| 4,984,460 A | 1/1991 | Isoda | |
| 5,020,919 A | 6/1991 | Suomi | |
| 5,056,047 A | 10/1991 | Sonergeld | |
| 5,064,604 A | 11/1991 | Barton | |
| 5,067,094 A | 11/1991 | Hayes | |
| 5,078,006 A | 1/1992 | Maresca, Jr. et al. | |
| 5,161,410 A | 11/1992 | Davey et al. | |
| 5,189,904 A | 3/1993 | Maresca, Jr. et al. | |
| 5,191,793 A | 3/1993 | Drexel et al. | |
| 5,201,212 A | 4/1993 | Williams | |
| 5,226,333 A | 7/1993 | Hess | |
| 5,228,329 A | 7/1993 | Dennison | |
| 5,233,868 A | 8/1993 | Coats et al. | |
| 5,259,243 A | 11/1993 | Drexel et al. | |
| 5,285,673 A | 2/1994 | Mudd | |
| 5,287,876 A | 2/1994 | Takahashi | |
| 5,299,594 A | 4/1994 | Lord et al. | |
| 5,316,035 A | 5/1994 | Collins et al. | |
| 5,335,555 A | 8/1994 | Guizot et al. | |
| 5,343,737 A | 9/1994 | Baumoel | |
| 5,347,861 A | 9/1994 | Satoh | |
| 5,375,455 A | 12/1994 | Maresca et al. | |
| 5,402,111 A | 3/1995 | Hubbard, Jr. | |
| 5,410,912 A | 5/1995 | Suzuki | |
| 5,415,033 A | 5/1995 | Maresca et al. | |
| 5,417,110 A | 5/1995 | Wood | |
| 5,437,180 A | 8/1995 | Sowinski | |
| 5,453,944 A | 9/1995 | Baumoel | |
| 5,461,910 A | 10/1995 | Hodson et al. | |
| 5,515,295 A | 5/1996 | Wang | |
| 5,525,040 A | 6/1996 | Andreae et al. | |
| 5,610,323 A | 3/1997 | Ashworth | |
| 5,676,132 A | 10/1997 | Tillotson et al. | |
| 5,685,194 A | 11/1997 | McCulloch et al. | |
| 5,705,753 A * | 1/1998 | Hastings | G01F 1/662 374/E11.01 |
| 5,741,968 A | 4/1998 | Arai | |
| 5,750,893 A | 5/1998 | Murata et al. | |
| 5,763,774 A | 6/1998 | Ha et al. | |
| 5,764,539 A | 6/1998 | Rani | |
| 5,869,758 A | 2/1999 | Huiberts | |
| 5,883,815 A | 3/1999 | Drakulich et al. | |
| 5,918,268 A | 6/1999 | Lukas et al. | |
| 5,936,156 A | 8/1999 | Roberts et al. | |
| 5,948,969 A | 9/1999 | Fierro et al. | |
| 6,023,969 A | 2/2000 | Feller | |
| 6,047,250 A | 4/2000 | Beaudoin et al. | |
| 6,085,588 A | 7/2000 | Khadikar et al. | |
| 6,098,455 A | 8/2000 | Nukui et al. | |
| 6,101,451 A | 8/2000 | Smith et al. | |
| 6,105,607 A | 8/2000 | Caise et al. | |
| 6,125,695 A | 10/2000 | Alvesteffer et al. | |
| 6,217,211 B1 | 4/2001 | Hesky | |
| 6,234,152 B1 | 5/2001 | Fritz et al. | |
| 6,240,775 B1 | 6/2001 | Uramachi et al. | |
| 6,348,869 B1 | 2/2002 | Ashworth | |
| 6,354,150 B1 | 3/2002 | Rudent et al. | |
| 6,411,192 B1 | 6/2002 | Landis | |
| 6,430,944 B1 | 8/2002 | Ozawa | |
| 6,437,692 B1 | 8/2002 | Petite et al. | |
| 6,474,155 B1 | 11/2002 | Berkcan et al. | |
| 6,487,904 B1 | 12/2002 | Myhre | |
| 6,508,235 B2 | 1/2003 | Fabre | |
| 6,530,263 B1 * | 3/2003 | Chana | F17D 5/06 73/40.5 A |
| 6,547,435 B1 | 4/2003 | Grosswig et al. | |
| 6,588,268 B1 | 7/2003 | Yamagishi et al. | |
| 6,626,037 B1 | 9/2003 | Wado et al. | |
| 6,647,777 B1 | 11/2003 | Kotaka et al. | |
| 6,658,931 B1 | 12/2003 | Plumb et al. | |
| 6,672,154 B1 | 1/2004 | Yamagishi et al. | |
| 6,681,582 B2 | 1/2004 | Suzuki et al. | |
| 6,681,625 B1 | 1/2004 | Berkcan et al. | |
| 6,779,919 B1 | 8/2004 | Staniforth et al. | |
| 6,834,556 B2 | 12/2004 | Cain et al. | |
| 6,837,271 B1 | 1/2005 | Saint | |
| 6,866,089 B2 | 3/2005 | Avila | |
| 6,883,369 B1 | 4/2005 | Myhre | |
| 6,891,838 B1 | 5/2005 | Petite et al. | |
| 6,914,893 B2 | 7/2005 | Petite | |
| 7,031,851 B2 | 4/2006 | Sherikar | |
| 7,053,767 B2 | 5/2006 | Petite et al. | |
| 7,076,373 B1 | 7/2006 | Munsterhuis et al. | |
| 7,084,778 B2 | 8/2006 | Shoub | |
| 7,103,511 B2 | 9/2006 | Petite | |
| 7,308,824 B2 | 12/2007 | Trescott et al. | |
| 7,358,860 B2 | 4/2008 | Germouni et al. | |
| 7,468,661 B2 | 12/2008 | Petite et al. | |
| 7,490,625 B1 | 2/2009 | Johnson et al. | |
| 7,536,900 B2 | 5/2009 | Nakamura et al. | |
| 7,623,028 B2 | 11/2009 | Kates | |
| 7,697,492 B2 | 4/2010 | Petite | |
| 7,711,500 B1 | 5/2010 | Killion et al. | |
| 8,188,359 B2 | 5/2012 | Chakraborty | |
| 8,290,721 B2 | 10/2012 | Wehrs et al. | |
| 8,413,615 B2 | 4/2013 | Tsuge | |
| 8,643,716 B1 | 2/2014 | Kalokitis et al. | |
| 8,882,345 B2 | 11/2014 | Wallace | |
| 8,910,530 B2 | 12/2014 | Gaarder | |

(56) References Cited

U.S. PATENT DOCUMENTS

| | | |
|---|---|---|
| 8,912,530 B2 | 12/2014 | Yang et al. |
| 8,935,106 B2 | 1/2015 | Balogh et al. |
| 8,935,110 B2 | 1/2015 | Hsieh et al. |
| 9,000,944 B2 | 4/2015 | Borlee |
| 9,146,172 B2 | 9/2015 | Trescott |
| 9,212,966 B2 | 12/2015 | Scheucher |
| 9,310,272 B2 | 4/2016 | Willemin et al. |
| 9,574,949 B2* | 2/2017 | Belli .................. G01K 11/32 |
| 9,633,552 B2 | 4/2017 | Janchookiat |
| 9,939,346 B2 | 4/2018 | Jerez |
| 9,982,799 B2* | 5/2018 | Hassell .............. F16K 37/0083 |
| 9,982,829 B2 | 5/2018 | Smyth et al. |
| 10,185,543 B2 | 1/2019 | Vilermo et al. |
| 10,428,495 B2 | 10/2019 | Halimi |
| 10,508,966 B2 | 12/2019 | Tooms et al. |
| 2001/0027684 A1 | 10/2001 | Letters et al. |
| 2001/0032503 A1 | 10/2001 | Schrittenlacher |
| 2001/0052261 A1 | 12/2001 | Lull et al. |
| 2002/0130780 A1 | 9/2002 | McQueen et al. |
| 2002/0147425 A1 | 10/2002 | Briggs et al. |
| 2003/0048190 A1 | 3/2003 | Landis |
| 2003/0079553 A1 | 5/2003 | Cain et al. |
| 2003/0115952 A1 | 6/2003 | Mayer et al. |
| 2003/0196487 A1 | 10/2003 | Ariyoshi |
| 2003/0221483 A1 | 12/2003 | McMillan et al. |
| 2004/0025585 A1 | 2/2004 | Seki et al. |
| 2004/0031331 A1 | 2/2004 | Blakley et al. |
| 2004/0045352 A1 | 3/2004 | Kamiunten et al. |
| 2004/0064270 A1 | 4/2004 | Luchner |
| 2004/0139799 A1 | 7/2004 | Sudolcan et al. |
| 2004/0149027 A1 | 8/2004 | Gimson |
| 2004/0194544 A1 | 10/2004 | Tokuhisa et al. |
| 2004/0225458 A1 | 11/2004 | Sherikar |
| 2004/0255667 A1 | 12/2004 | Konzelmann et al. |
| 2005/0005683 A1 | 1/2005 | Wolford et al. |
| 2005/0072225 A1 | 4/2005 | Kanke et al. |
| 2005/0081620 A1 | 4/2005 | Ito et al. |
| 2005/0155421 A1 | 7/2005 | Koike et al. |
| 2005/0155663 A1 | 7/2005 | Dhellemmes et al. |
| 2005/0188776 A1 | 9/2005 | Kunter et al. |
| 2005/0193802 A1 | 9/2005 | Tipler |
| 2005/0222782 A1 | 10/2005 | Kottenstette et al. |
| 2005/0223793 A1 | 10/2005 | Markus |
| 2005/0229714 A1 | 10/2005 | Willigen |
| 2006/0010973 A1 | 1/2006 | Brown |
| 2006/0027267 A1 | 2/2006 | Fritze |
| 2006/0108003 A1 | 5/2006 | Bradford et al. |
| 2006/0161311 A1 | 7/2006 | Vinson et al. |
| 2006/0161357 A1 | 7/2006 | Munsterhuis et al. |
| 2006/0162442 A1 | 7/2006 | Matsumoto et al. |
| 2006/0207320 A1 | 9/2006 | Yamada et al. |
| 2006/0213263 A1 | 9/2006 | Kawanishi et al. |
| 2006/0225507 A1* | 10/2006 | Paulson .................. F17D 5/06 |
| | | 73/592 |
| 2006/0230826 A1 | 10/2006 | Nakamura et al. |
| 2006/0234414 A1 | 10/2006 | Van Der Wiel |
| 2006/0272830 A1 | 12/2006 | Fima |
| 2006/0283236 A1 | 12/2006 | Trescott et al. |
| 2007/0039662 A1 | 2/2007 | Shuey |
| 2007/0047616 A1 | 3/2007 | Izumiura et al. |
| 2007/0137297 A1 | 6/2007 | Gehman et al. |
| 2007/0160108 A1 | 7/2007 | Kent |
| 2007/0174016 A1 | 7/2007 | Ding et al. |
| 2007/0001815 A1 | 8/2007 | Nakano et al. |
| 2007/0219650 A1 | 9/2007 | Wang et al. |
| 2007/0261477 A1* | 11/2007 | Koike ................. G01M 3/3245 |
| | | 73/49.2 |
| 2007/0290134 A1 | 12/2007 | Key et al. |
| 2007/0295081 A1 | 12/2007 | Orban et al. |
| 2008/0008223 A1 | 1/2008 | Guillet |
| 2008/0013291 A1 | 1/2008 | Bork |
| 2008/0016958 A1 | 1/2008 | Matsumoto et al. |
| 2008/0023196 A1 | 1/2008 | Crawley et al. |
| 2008/0034861 A1 | 2/2008 | Bognar |
| 2008/0047339 A1 | 2/2008 | Hasebe |
| 2008/0092644 A1 | 4/2008 | Hasebe |
| 2008/0115565 A1 | 5/2008 | Yanagi et al. |
| 2008/0121022 A1 | 5/2008 | Koike et al. |
| 2008/0133152 A1 | 6/2008 | Nitschke et al. |
| 2008/0168783 A1 | 7/2008 | Kojima et al. |
| 2008/0210002 A1 | 9/2008 | Kamiunten et al. |
| 2008/0282791 A1 | 11/2008 | Nakano et al. |
| 2008/0289410 A1 | 11/2008 | Pape et al. |
| 2008/0289411 A1 | 11/2008 | Schrag et al. |
| 2008/0289412 A1 | 11/2008 | Huck |
| 2008/0295590 A1 | 12/2008 | Sukegawa et al. |
| 2008/0307879 A1 | 12/2008 | Borst et al. |
| 2009/0000372 A1 | 1/2009 | Matsumoto et al. |
| 2009/0007968 A1 | 1/2009 | Knecht et al. |
| 2009/0025473 A1 | 1/2009 | Imai et al. |
| 2009/0071625 A1 | 3/2009 | Lyon |
| 2009/0094999 A1 | 4/2009 | Leatherbarrow |
| 2009/0116535 A1 | 5/2009 | Rund |
| 2009/0120206 A1 | 5/2009 | Matsubara |
| 2009/0201969 A1 | 8/2009 | Krauss et al. |
| 2009/0234513 A1 | 9/2009 | Wiggins |
| 2009/0308140 A1 | 12/2009 | Haseloh et al. |
| 2010/0037688 A1 | 2/2010 | Inoue et al. |
| 2010/0045951 A1 | 2/2010 | Martens et al. |
| 2010/0089118 A1 | 4/2010 | Mayer et al. |
| 2010/0089459 A1 | 4/2010 | Smirnov et al. |
| 2010/0110437 A1 | 5/2010 | Furtaw et al. |
| 2010/0139390 A1 | 6/2010 | Gimson et al. |
| 2010/0147068 A1 | 6/2010 | Neuhaus et al. |
| 2010/0206090 A1 | 8/2010 | Stack |
| 2010/0223991 A1 | 9/2010 | Muraoka et al. |
| 2010/0265096 A1 | 10/2010 | Cornwall et al. |
| 2010/0280769 A1 | 11/2010 | Levy |
| 2011/0025511 A1 | 2/2011 | Wein |
| 2011/0061841 A1 | 3/2011 | Zolock et al. |
| 2011/0098944 A1 | 4/2011 | Pfau et al. |
| 2011/0100114 A1 | 5/2011 | De Corral |
| 2011/0178736 A1 | 7/2011 | Westra et al. |
| 2011/0209526 A1 | 9/2011 | Wagner |
| 2011/0295540 A1 | 12/2011 | Mäkinen |
| 2011/0296910 A1 | 12/2011 | Lopez et al. |
| 2011/0301848 A1 | 12/2011 | Garcia et al. |
| 2011/0308300 A1 | 12/2011 | Bandaru et al. |
| 2012/0067542 A1 | 3/2012 | Frach et al. |
| 2012/0097253 A1 | 4/2012 | Eutsler |
| 2012/0180877 A1* | 7/2012 | Pallais .................. G01K 7/22 |
| | | 137/487.5 |
| 2012/0191381 A1 | 7/2012 | Takakura et al. |
| 2012/0192642 A1 | 8/2012 | Speldrich et al. |
| 2012/0192644 A1 | 8/2012 | Asano et al. |
| 2012/0206272 A1 | 8/2012 | Borlee |
| 2012/0232809 A1 | 9/2012 | Steckling |
| 2012/0245884 A1 | 9/2012 | Wohrle |
| 2012/0247189 A1* | 10/2012 | Finlay .................. G01M 3/26 |
| | | 73/40.5 A |
| 2012/0279316 A1 | 11/2012 | Gaarder |
| 2012/0304746 A1 | 12/2012 | Gerhardt |
| 2012/0324985 A1 | 12/2012 | Gu et al. |
| 2012/0329166 A1 | 12/2012 | Sharping et al. |
| 2013/0014577 A1 | 1/2013 | Tam et al. |
| 2013/0031973 A1 | 2/2013 | Kirst et al. |
| 2013/0041234 A1 | 2/2013 | Grinstein et al. |
| 2013/0041588 A1 | 2/2013 | Johnson et al. |
| 2013/0066568 A1 | 3/2013 | Alonso |
| 2013/0081449 A1 | 4/2013 | Li et al. |
| 2013/0085688 A1 | 4/2013 | Miller et al. |
| 2013/0098150 A1 | 4/2013 | Sella |
| 2013/0106616 A1 | 5/2013 | Gustafsson et al. |
| 2013/0174649 A1 | 7/2013 | Hains et al. |
| 2013/0276549 A1* | 10/2013 | Gaarder .................. G01F 1/68 |
| | | 73/861.95 |
| 2013/0332103 A1* | 12/2013 | Houldsworth ......... G01K 7/427 |
| | | 702/130 |
| 2014/0034145 A1 | 2/2014 | Burt |
| 2014/0046605 A1 | 2/2014 | McHugh et al. |
| 2014/0049008 A1 | 2/2014 | Ziegler |
| 2014/0109882 A1 | 4/2014 | Hoegl et al. |
| 2014/0196802 A1 | 7/2014 | Guy et al. |
| 2014/0238511 A1 | 8/2014 | Klicpera |

(56) References Cited

U.S. PATENT DOCUMENTS

| | | | |
|---|---|---|---|
| 2014/0260549 A1 | 9/2014 | Dudar et al. | |
| 2014/0261693 A1 | 9/2014 | Geerligs et al. | |
| 2014/0290335 A1 | 10/2014 | Shanks | |
| 2014/0290355 A1 | 10/2014 | Booten et al. | |
| 2014/0298919 A1 | 10/2014 | Milley et al. | |
| 2014/0306828 A1 | 10/2014 | Trescott et al. | |
| 2014/0348205 A1* | 11/2014 | Shaw | E03B 7/09 374/142 |
| 2014/0360262 A1 | 12/2014 | Asano et al. | |
| 2014/0376594 A1 | 12/2014 | Daily et al. | |
| 2015/0006092 A1 | 1/2015 | Grohmann | |
| 2015/0020587 A1 | 1/2015 | Milley et al. | |
| 2015/0027221 A1 | 1/2015 | Aizawa et al. | |
| 2015/0091721 A1 | 4/2015 | Zinevich | |
| 2015/0120133 A1 | 4/2015 | Dudar et al. | |
| 2015/0122009 A1 | 5/2015 | Berkcan et al. | |
| 2015/0134277 A1 | 5/2015 | Van Doorn | |
| 2015/0153208 A1 | 6/2015 | Arnold et al. | |
| 2015/0192442 A1 | 7/2015 | Olin | |
| 2015/0219522 A1 | 8/2015 | Tseng et al. | |
| 2015/0268264 A1 | 9/2015 | Nelson | |
| 2015/0300856 A1 | 10/2015 | Pfau et al. | |
| 2015/0300908 A1 | 10/2015 | Laramee et al. | |
| 2015/0310678 A1 | 10/2015 | Ito | |
| 2015/0316401 A1 | 11/2015 | Popp et al. | |
| 2015/0337679 A1 | 11/2015 | Everwyn et al. | |
| 2015/0376874 A1 | 12/2015 | Breedlove | |
| 2016/0011031 A1 | 1/2016 | Asano et al. | |
| 2016/0025536 A1 | 1/2016 | Madsen | |
| 2016/0084693 A1 | 3/2016 | Lang et al. | |
| 2016/0138988 A1 | 5/2016 | Hansmann et al. | |
| 2016/0161940 A1 | 6/2016 | Max | |
| 2016/0163177 A1 | 6/2016 | Klicpera | |
| 2016/0187175 A1 | 6/2016 | Suzuki et al. | |
| 2016/0245681 A1 | 8/2016 | Maginnis et al. | |
| 2016/0265685 A1 | 9/2016 | Hassell et al. | |
| 2016/0265955 A1 | 9/2016 | Easey et al. | |
| 2016/0320245 A1 | 11/2016 | Herbron | |
| 2016/0334045 A1 | 11/2016 | Smyth et al. | |
| 2017/0138022 A1* | 5/2017 | Trescott | G01F 1/7084 |
| 2017/0184432 A1 | 6/2017 | Umezawa et al. | |
| 2017/0247863 A1 | 8/2017 | Kobayashi et al. | |
| 2017/0343401 A1 | 11/2017 | Arnold et al. | |
| 2017/0356774 A1* | 12/2017 | Gaberthuel | G01F 1/6842 |
| 2018/0010978 A1 | 1/2018 | Bailey | |
| 2018/0031439 A1 | 2/2018 | Tooms et al. | |
| 2018/0038722 A1 | 2/2018 | Ozaki et al. | |
| 2018/0058891 A1 | 3/2018 | Easy et al. | |
| 2018/0135808 A1 | 5/2018 | André et al. | |
| 2018/0231268 A1 | 8/2018 | Combe et al. | |
| 2018/0238747 A1 | 8/2018 | Choi et al. | |
| 2018/0291911 A1 | 10/2018 | Ward et al. | |
| 2019/0004098 A1 | 1/2019 | Wong et al. | |
| 2019/0128762 A1 | 5/2019 | Bailey et al. | |
| 2020/0003646 A1* | 1/2020 | Krywyj | G01F 15/06 |
| 2020/0033063 A1* | 1/2020 | Rajagopalan | B23K 9/0282 |

FOREIGN PATENT DOCUMENTS

| | | | |
|---|---|---|---|
| CN | 202693053 U | 1/2013 | |
| CN | 103016958 A | 4/2013 | |
| CN | 104006930 A | 8/2014 | |
| CN | 104006931 A | 8/2014 | |
| CN | 104373820 B | 3/2017 | |
| DE | 3827444 A1 | 2/1990 | |
| DE | 19858307 A1 | 6/2000 | |
| DE | 19858320 A1 | 6/2000 | |
| DE | 19921256 A1 | 11/2000 | |
| DE | 10017958 A1 | 12/2000 | |
| DE | 102004061261 A1 | 6/2006 | |
| DE | 102007037394 A1 | 2/2009 | |
| DE | 102012022991 A1 | 5/2014 | |
| DE | 102013006874 A1 | 10/2014 | |
| DE | 202014100330 U1 | 5/2015 | |
| DE | 102014114848 A1 | 4/2016 | |
| EP | 0989396 A2 | 3/2000 | |
| EP | 1006500 A2 | 6/2000 | |
| EP | 1247082 A2 | 10/2002 | |
| EP | 1431717 A1 | 6/2004 | |
| EP | 1643230 B | 4/2006 | |
| EP | 2000784 A1 | 12/2008 | |
| EP | 2000788 A1 | 12/2008 | |
| EP | 2126531 A1 | 12/2009 | |
| EP | 2253 897 A1 | 11/2010 | |
| EP | 2518465 A2 | 10/2012 | |
| EP | 2682719 A1 | 1/2014 | |
| EP | 2703800 A1 | 3/2014 | |
| EP | 2840362 A1 | 2/2015 | |
| EP | 3067671 A1 | 9/2016 | |
| EP | 3268702 A1 | 1/2018 | |
| EP | 3350560 B1 | 10/2019 | |
| EP | 3047567 B1 | 6/2020 | |
| ES | 2354673 A1 | 3/2011 | |
| FR | 2318410 A1 | 2/1977 | |
| FR | 2763665 A1 | 11/1998 | |
| GB | 1246670 A | 9/1971 | |
| GB | 1504334 A | 3/1978 | |
| GB | 1517740 A | 7/1978 | |
| GB | 1604170 A | 12/1981 | |
| GB | 2104958 A * | 3/1983 | F02B 77/082 |
| GB | 2104958 A | 3/1983 | |
| GB | 2289760 A | 11/1995 | |
| GB | 2452043 A | 2/2009 | |
| GB | 2475257 A | 5/2011 | |
| GB | 2516770 A | 2/2015 | |
| GB | 2536364 A | 9/2016 | |
| GB | 2537013 | 10/2016 | |
| GB | 2545830 A | 6/2017 | |
| GB | 2546018 A | 7/2017 | |
| GB | 2546126 A | 7/2017 | |
| GB | 2533936 A | 10/2017 | |
| GB | 2549209 A | 10/2017 | |
| GB | 2559737 A | 8/2018 | |
| GB | 2559836 A | 8/2018 | |
| GB | 2562695 A | 11/2018 | |
| GB | 2576358 A | 2/2020 | |
| GB | 2576501 A | 2/2020 | |
| IL | 47511 A | 7/1977 | |
| IN | 201717036197 A | 12/2017 | |
| JP | 56079230 A | 6/1981 | |
| JP | S 57-198840 A | 12/1982 | |
| JP | S 58-86417 A | 5/1983 | |
| JP | S 61-26829 A | 2/1986 | |
| JP | 61195326 A | 8/1986 | |
| JP | 8054268 A | 2/1996 | |
| JP | H 0854268 A | 2/1996 | |
| JP | 2001091369 A | 4/2001 | |
| JP | 2006259733 A * | 9/2006 | G03G 15/2039 |
| JP | 2007-127065 A | 5/2007 | |
| JP | 2007127065 A * | 5/2007 | |
| JP | 2018-036101 A | 3/2018 | |
| RU | 2232379 C | 7/2004 | |
| WO | WO 9626425 A1 | 8/1996 | |
| WO | WO 9726520 A1 | 7/1997 | |
| WO | WO 98/008069 A1 | 2/1998 | |
| WO | WO 0125743 A2 | 4/2001 | |
| WO | WO 0198736 A1 | 12/2001 | |
| WO | WO 2004/020958 | 3/2003 | |
| WO | WO 03/029759 A1 | 4/2003 | |
| WO | WO 03/0523 56 A1 | 6/2003 | |
| WO | WO 2004025241 A1 | 3/2004 | |
| WO | WO 2004/063679 A1 | 7/2004 | |
| WO | WO 2005047828 A1 | 5/2005 | |
| WO | WO 2006/058863 A1 | 6/2006 | |
| WO | WO 2007/063110 A1 | 6/2007 | |
| WO | WO 2008102104 A1 | 8/2008 | |
| WO | WO 2009024746 A2 | 2/2009 | |
| WO | WO 2009/051588 A | 4/2009 | |
| WO | WO 10103521 A2 | 9/2010 | |
| WO | WO 2010114408 A1 | 10/2010 | |
| WO | WO 2010/142999 A2 | 12/2010 | |
| WO | WO 10139914 A1 | 12/2010 | |
| WO | WO 2011107101 A1 | 9/2011 | |

(56) References Cited

FOREIGN PATENT DOCUMENTS

| WO | WO 2012/035483 A2 | 3/2012 |
|---|---|---|
| WO | WO 2012033908 A1 | 3/2012 |
| WO | WO 2013/110603 A1 | 8/2013 |
| WO | WO-2014/173414 A1 | 10/2014 |
| WO | WO 2014/173414 A1 | 10/2014 |
| WO | WO 2014/203246 A1 | 12/2014 |
| WO | WO 2014194982 A2 | 12/2014 |
| WO | WO 2015/000487 A1 | 1/2015 |
| WO | WO 2015/019081 A1 | 2/2015 |
| WO | WO-2015/039664 A1 | 3/2015 |
| WO | WO 2015028629 A1 | 3/2015 |
| WO | WO 2015/093941 A1 | 6/2015 |
| WO | WO 2015097407 A1 | 7/2015 |
| WO | WO 2015/119139 A1 | 8/2015 |
| WO | WO 2015/139760 A1 | 9/2015 |
| WO | WO 2015/171196 A1 | 11/2015 |
| WO | WO 2015/178904 A1 | 11/2015 |
| WO | WO 2015166265 A1 | 11/2015 |
| WO | WO 2015166429 A1 | 11/2015 |
| WO | WO 2015178904 A1 | 11/2015 |
| WO | WO 2015/192857 A1 | 12/2015 |
| WO | WO 2016/044866 A1 | 3/2016 |
| WO | WO 2016/096498 A1 | 6/2016 |
| WO | WO 2016/102124 A1 | 6/2016 |
| WO | WO 16110696 A1 | 7/2016 |
| WO | WO 2016110696 A1 | 7/2016 |
| WO | WO 2016/124931 | 8/2016 |
| WO | WO 2016/124931 A1 | 8/2016 |
| WO | WO 2016/140019 A1 | 9/2016 |
| WO | WO 2016146500 A1 | 9/2016 |
| WO | WO-201 7045819 A1 | 3/2017 |
| WO | WO 2017/118834 A1 | 7/2017 |
| WO | WO-2016067558 A1 | 9/2017 |
| WO | WO 2018/007802 A1 | 1/2018 |
| WO | WO-2018/010746 A1 | 1/2018 |

OTHER PUBLICATIONS

"Temperature Detection," Neptune Oceanographies, found to be available on Nov. 24, 2015, 1 page, retrieved from https://www.neptuneoceanographics.com/thermal-leak-detection.

Glennen, "LeakBot and HomeServe Labs Fight Leaky Pipes," Insurance Business Magazine, published on Jul. 15, 2016, 2 pages.

U.S. Office Action directed to U.S. Appl. No. 15/541,856, dated Jul. 17, 2019; 16 pages.

International Search Report and Written Opinion directed to International Patent Application No. PCT/GB2016/050021, dated May 19, 2016; 13 pages.

English-language abstract of CN 103016958 A; 2 pages.

English-language abstract of DE 102004061261 A1; 2 pages.

English-language abstract of DE 102013006874 A1; 1 page.

English-language abstract of DE 19858307 A1; 1 page.

English-language abstract of DE 19921256 A1; 1 page.

English-language abstract of DE 202014100330 U1; 1 page.

English-language abstract of DE 3827444 A1; 2 pages.

English-language abstract of EP 0989396 A2; 2 pages.

English-language abstract of EP 1643230 B; 2 pages.

English-language abstract of EP 2518465 A2; 2 pages.

English-language abstract of ES 2354673 A1; 1 page.

English-language abstract of FR 2763665 A1; 1 page.

English-language abstract of WO 0198736 A1; 2 pages.

English-language abstract of WO 10139914 A1; 2 pages.

English-language abstract of WO 2004025241 A1; 2 pages.

English-language abstract of WO 2015097407 A1; 2 pages.

English-language abstract of WO 9626425 A1; 2 pages.

English-language abstract of Chinese Patent Application Publication No. CN 20269053 U, published Jan. 23, 2013; 1 page.

English-language abstract of German Patent Application Publication No. DE 10017958 A1 Dec. 21, 2000; 1 page.

English-language abstract of German Patent Application Publication No. DE 102007037394 A1 Feb. 12, 2009; 1 page.

English-language abstract of German Patent Application Publication No. DE 102012022991 A1, published May 28, 2014; 1 page.

English-language abstract of German Patent Application Publication No. DE 102014114848 A1, Apr. 14, 2016; 2 pages.

English-language abstract of French Patent Application Publication No. FR 2318410 A1, published Feb. 2, 1977; 1 page.

English-language abstract of Japanese Patent Application Publication No. JP 2001091369 A, published Apr. 6, 2001; 1 page.

English-language abstract of Russian Patent No. RU 2232379 C, published Jul. 10, 2004; 1 page.

English-language abstract of International Patent Application Publication No. WO 98/008,069 A1, published Feb. 26, 1998; 1 page.

English-language abstract of International Patent Application Publication No. WO 2006/058863 A1, published Jun. 8, 2006; 1 page.

English-language abstract of International Patent Application Publication No. WO 2007/063110 A1, published Jun. 7, 2006; 2 pages.

English-language abstract of International Patent Application Publication No. WO 2013/110603 A1, published Aug. 1, 2013; 1 page.

English-language abstract of Japanese Patent Application Publication No. JP 56079230 A, published Jun. 29, 1981; 2 pages.

English-language abstract of Japanese Patent Application Publication No. JP 61195326 A, published Aug. 29, 1986; 2 pages.

English-language abstract of Japanese Patent Application Publication No. JP 8054268 A, published Feb. 27, 1996; 1 page.

English-language abstract of International Patent Application Publication WO 2004/020958 A1, published Mar. 11, 2004; 2 pages.

* cited by examiner

FLOW DETECTION DEVICE

CROSS-REFERENCE TO RELATED APPLICATIONS

This application is a continuation of U.S. patent application Ser. No. 15/541,856, filed on Jul. 6, 2017, now pending, which is a 371 national phase filing of international application number PCT/GB2016/050021, filed Jan. 6, 2016, now pending, all of which are now entirely incorporated by reference herein.

FIELD OF THE INVENTION

Embodiments of this invention relate to a device for detecting flow in pipes, in particular a fluid flow detector, a leak detector and a water supply system comprising such a leak detector.

BACKGROUND OF THE INVENTION

Being able to detect fluid flow in a pipe has many useful applications. A key one is detecting the presence of leaks in a pipe system. Detecting flow in a system when all taps and valves are closed will usually indicate the presence of a leak in the system being monitored.

Pipe systems can be used to transmit a complete range of fluids from air and other gasses, including combustible gasses to liquids. The liquids can be water, oils or any other liquid. In any pipe system it is important to know if there is leakage in the pipe system.

Many technologies exist for measuring flow. Many involve a mechanical device in the flow e.g. an impellor or nutating disc. In order to fit these, the system must be drained and the device inserted in the pipe. This can be inconvenient. Additionally, there is a risk of leak in the area where the measurement device has been inserted.

Non-invasive measuring techniques also exist—e.g. ultrasound and thermal mass flow measurement. However, ultrasound systems tend to be relatively expensive and do not detect flow velocities less than around 1 cm/sec. Thermal mass flow metering requires the fluid to be heated by an element which requires too much power for a system to be battery powered for an extended period of time.

It is an object of embodiments of the present invention to provide a preferably non-invasive method of detecting fluid flow in a pipe system.

It is also desirable in embodiments to be able to monitor flow rates—or lack thereof remotely from a central control unit or monitoring station.

Embodiments of the present invention provide a system, device and a method for non-invasively detecting fluid flow in a pipe. Advantageously, the method and system or device may be a low powered method suitable for a battery powered monitor.

For use in understanding the present invention, the following disclosures are referred to:
US2010/206090 A1 (Stack);
EP2840362 (Kamstrup);
WO2015/097407 A1 (GRDF);
US2012/206272 A1 (Borlee);
US9146172 B2 (Trescott);
US7308824 B2 (Trescott);
http://www.aircon.panasonic.eu/GB_en/happening/4679/ found to be available at 24.11.15;
http://www.neptuneoceanographics.com/thermal-leak-detection.php found to be available at 24.11.15.

SUMMARY

According to the present invention, there is provided a fluid flow detector as defined in claim 1. An embodiment of the fluid flow detector is for detecting fluid flow in a pipe system, the detector having a first temperature sensor to detect ambient temperature, a second temperature sensor configured to be mounted adjacent or in thermal contact with a pipe of the pipe system, a processing means configured to determine a temperature difference between the first and second temperature sensors and if the temperature difference is below a predetermined threshold for a predetermined period, to determine that no fluid if flowing in the pipe system. The processing means may comprise one or more processors.

The inventor has determined that in a pipe system, if there is no flow of fluid in the pipe system, the temperature of the fluid in the pipe, sufficiently distant from any other sources of heating or cooling, will approach ambient temperature over a period of time. By determining the ambient temperature of air or other medium around the pipe system and the temperature of the fluid in the system, it is possible to determine if fluid is flowing in the pipe system. If the temperature of the fluid in the pipe system is monitored over a period and compared to ambient temperature and the two values approach each other and maintain a predetermined difference or less for a predetermined time, a no flow condition can be determined to exist. If the temperature differences remain outside a predetermined set of parameters, it can be assumed there is a flow in the pipe system.

If on the other hand, the difference in temperatures between the "ambient" and the fluid in the pipe is greater than a predetermined value for a predetermined period, there can be assumed to be a flow condition.

The fluid flow detector may comprise a single device or a system having more than one device. Thus, references to a device throughout this specification are interchangeable with references to a system.

There may be provided the device in which a zero flow condition is determined if the temperature difference between the temperature sensors is less than about 1.0 deg C. (degrees Centigrade) for at least one hour. (The fluid flow detector being referred to as a device; as noted the detector may be a system comprising more than one device).

There may further be provided the device in which a zero flow condition is determined if the temperature difference between the temperature sensors is less than about 0.5 deg C. and preferably (i.e., optionally) less than 0.3 deg C. for at least one hour.

There may further be provided the device in which a zero flow condition is determined if the temperature difference between the temperature sensors is less than 0.1 deg C. for at least one hour.

The determination of a zero flow condition is particularly useful in a number of environments or installations such as domestic, office or industrial water systems, reserve or standby fluid pipe systems such as might be employed in emergency or backup systems.

In such systems there are periods when it can be anticipated there will not be any fluid flow. This lack of flow will provide sufficient time for the fluid temperature to converge to the ambient temperature. Such periods can be, for example, overnight or at weekends.

There may further be provided the comprising means in which in an alarm signal is generated if the temperature differences fall outside predetermined parameters for a predetermined time. Such a means may be implemented in various ways, for example using an audible and/or visual indication and/or communication to a remote entity, and may be described as an alarm generator.

In one example, ideally suited to such a system is a domestic or office water supply system. In these systems, water is supplied from a mains system normally entering a building from under the ground. In normal circumstances, when fluid is flowing, there will be a temperature difference between the incoming fluid and the temperature of the air surrounding the pipe several centimeters from the ground. By monitoring these two temperatures over a period of time their convergence can be monitored and providing the difference in the determined temperatures are less than a predetermined value for a predetermined period, a leak free condition can be considered to be achieved. However, if there is a continuing small temperature difference, particularly during a time when no flow would be expected, a leak condition can be considered to arise and an alarm or alert can be raised.

Preferably, the temperature sensor used to detect the water temperature is in good thermal contact with the pipe. Alternatively, if the sensor is in close proximity to the pipe it may be possible to measure the temperature of the fluid in the pipe with sufficient accuracy to enable a control and monitoring unit to detect a temperature difference.

Various mechanisms can be envisaged to ensure the pipe sensor is in good contact with the pipe. These could include biasing the sensor so that it is biased into contact with the pipe by spring or other biasing means. Alternatively, and more advantageously from the device construction point of view, a spring clip can be used to ensure the device is securely clipped to the pipe and can be arranged to ensure the temperature sensor is in good contact with the pipe. Alternatively a strap or other tie mechanism could pass around the pipe, securing the sensor to the pipe. This could apply a pressure maintaining the thermal contact with the pipe.

The device is provided with an Electronic Control Unit (ECU) or a microcontroller which can be configured to have one of many arrangements. It can be provided with a large number of pre-programmed calibrations and measure temperatures and signal alarms according to a set of preprogrammed instructions.

Alternatively, each device can be provided with an ECU which is capable of calibrating the measurements obtained from the two temperature sensors and be further calibrated according to the type and details of the installation. This latter is advantageous in that it should ensure greater accuracy and reduce the number of false alarms.

The ECU needs to be capable of monitoring the outputs provided by each of the temperature sensors and comparing them over an extended period of time to determine any differences and whether the differences fall within predetermined thresholds. If the appropriate criteria are satisfied an alarm signal can be generated.

In a domestic or office environment, the temperature of the incoming cold water in a water supply varies through the year, but is typically different to room temperature due to the water being chilled or heated by the earth surrounding the subterranean supply pipes. Water flowing through the pipes will then tend to chill the pipes (or warm them, depending on the climate or time of year) to a measurable degree, even at very low flow rates (down to 5 ml/min). This phenomenon can be used to detect whether or not water is flowing in the pipe.

By measuring the temperature difference for an extended period of time, the presence (or absence) of flow can be detected. For a typical domestic dwelling, periods of zero flow (e.g. at night) can be expected. If flow is detected, it probably indicates the presence of a water leak or a dripping tap or valve in a toilet. A user can then be alerted to the presence of the leak so they can fix the problem, reducing water damage to a property and reducing water wastage.

It is also now well known that in modern domestic environments it is increasingly common to operate water consuming domestic appliances, such as washing machines or dishwashing machines, at night in order to benefit from cheaper energy tariffs available. Operation of such appliances will result in a rapid and significant flow of water at periods during the operation cycle. This rapid flow will cause a sudden change in temperature of the water in the pipe. The monitoring system may therefore be provided with means, generally comprising a processor and/or at least one temperature sensor, to detect the sudden and significant temperature change and an ECU may be programmed to ignore or discount such sudden surges and not produce an alarm condition.

In such circumstances the monitoring system may be triggered to reset itself so it again waits for the temperatures to converge, and begin monitoring afresh.

There is further provided a leak detector comprising the fluid flow detector, wherein the leak detector is configured to indicate a leak detection if the temperature difference is not below a predetermined threshold for the predetermined period, wherein the leak detector is configured to indicate a leak of the pipe system preferably wherein the pipe system is of a domestic building or of an office water supply system.

Advantageously, the leak detector is for detecting a leak in a domestic building or office water supply system comprising a pipe, the leak detector having a first temperature sensor detecting ambient temperature, a second temperature sensor configured to be mounted adjacent or in thermal contact with a pipe of the pipe system, and a processor configured to determine a temperature difference between the first and second temperature sensors, wherein the processing means is configured to determine a heat transfer indicator based on a ratio of an indicator of time gradient of the sensed pipe temperature relative to the determined temperature difference between the first and second temperature sensors, wherein said temperature of the pipe is sensed by the second temperature sensor, the processing means further configured to determine if the heat transfer indicator is below a predetermined threshold for a predetermined period and to: if the heat transfer indicator is below a predetermined threshold for a predetermined period, indicate a leak detection; and/or if the heat transfer indicator is not below a predetermined threshold for a predetermined period, indicate absence of a leak detection.

The processing means may be configured to determine a best fit exponential function to the sensed temperature of the pipe and determine said indicator of time gradient of temperature of the pipe on the basis of said exponential function.

A preferred embodiment of the leak detector implements the above leak detection based on if the temperature difference is not below a predetermined threshold for the predetermined period and further implements the above leak detection based on the ratio of an indicator of time gradient of the sensed pipe temperature relative to the determined temperature difference. The two methods—the first based on if the temperature difference is not below a predetermined threshold for the predetermined period, the second based on the ratio of an indicator of time gradient of the sensed pipe temperature relative to the determined temperature difference—may be combined in an embodiment, e.g., may run in parallel to provide redundancy and/or to improve robustness. If either algorithm predicted a leak a number (1 or more) of times then a leak could be reported for example by outputting an alarm. In an embodiment, a result from either method may over-ride the result from the other, for example where the method based on gradient indicator is deemed more reliable, this may over-ride any leak detection result from the temperature difference-based method. In an embodiment where both methods are run in parallel, an alarm may be reported if either detect a leak. Alternatively, the temperature difference method could be run to detect low flow leaks when the starting temperature difference is high (e.g. above 0.5 or 1 C), and the gradient based method run when the starting temperature difference(s) are low (e.g. below 0.5 or 1 C). The gradient based method could be run to pick up high flow rate leaks when the temperature difference is high.

The processing means may be configured to monitor an indicator of a second order derivative with respect to time of the pipe temperature sensed by the second temperature sensor and to detect if said second order derivative indicator has been below a predetermined value for a predetermined time duration, wherein the leak detector is configured to perform, in response to a said detection that said second order derivative indicator has been below a predetermined value for a predetermined time duration, said determining if the temperature difference is below a predetermined threshold for a predetermined period or said determining if the heat transfer indicator is below a predetermined threshold for a predetermined period. This may be advantageous, for example to allow a lack of water usage for a period to be established before allowing leak monitoring to begin.

The leak detector may be configured to detect when an indicator of a second order derivative of the pipe temperature with respect to time exceeds a predetermined value and to start a said predetermined period in response to a said detection. This may be advantageous for example if is desired to ensure that a predetermined period for monitoring for a leak is always started from a last water usage detection.

Furthermore, the leak detector may be configured to vary the predetermined threshold dependent on a said temperature difference at the start of the predetermined period. Such variation may be implemented at a unit that is remote from the pipe, for example dependent on a weather forecast.

The leak detector may be configured to determine a time when the pipe should have no flow in the absence of any leak and, if there is any residual temperature difference between the pipe and ambient at that time, adjust a said predetermined threshold dependent on said residual temperature difference. This be may be viewed as a form of calibration. The determination of the time when the pipe should have no flow may be based on existing data stored internally, e.g, the leak detector already knows that no flow should occur at, e.g., 3 am, each night, or the leak detector may learn such a time based on information received from a remote entity. Preferably the leak detector monitors for such a residual temperature difference only during a set period, e.g., the first 24 hrs, of the device being powered up, before normal leak monitoring operation is allowed to begin.

Preferably, the leak detector comprises an alarm generator to output an alarm in response to at least one said leak detection, the leak detector configured to detect a change in the sensed pipe temperature and to disable the alarm generator until a predetermined number of said changes in the sensed pipe temperature (preferably relative to the ambient temperature) has been detected, wherein the predetermined number is at least one, preferably wherein the change detection comprises a detection that a pipe temperature change (preferably relative to the ambient temperature) and/or a rate of change of the pipe temperature (preferably relative to the ambient temperature) exceeds a respective predetermined value. The detection of the predetermined number may require such detection within a predetermined time interval, e.g., may require 3 such changes to be detected during a time span of 24 hrs. Advantageously, the requirement to detect such a number of changes may ensure that the leak detector only begins to monitor for leaks after it is established with reasonable certainty that the leak detector is actually fitted to a pipe.

A leak detector may comprise an alarm generator to output an alarm in response to at least one said leak detection and comprising a user interface to enable a user to stop the alarm, the leak detector configured to store internally and/or communicate externally that, and preferably also when, the alarm has been stopped. Thus, a third party may be able to establish that the alarm has been reset.

Preferably, the leak detector comprises an alarm generator to output an alarm in response to a predetermined number of said leak detections, wherein said predetermined number is at least two and each said leak detection occurs during a respective one of successive said predetermined periods. Such an embodiment may effectively filter leak detections to prevent or reduce false alarms.

The leak detector may comprise an alarm generator to output an alarm in response to at least one leak said detection during a said predetermined period, the leak detector further configured to disable a said alarm output (preferably for a predetermined time duration) by the alarm generator if: a change of at least the sensed pipe temperature (preferably relative to the ambient temperature) indicates presence of a leak during a first said predetermined period; and then a change of at least the sensed pipe temperature (preferably relative to the ambient temperature) indicates absence of a leak during a second said predetermined period, wherein the first and second said predetermined periods are successive said predetermined periods, and optionally if a change of at least the sensed pipe temperature (preferably relative to the ambient temperature) indicates presence of a leak during a third said predetermined period, wherein the second and third said predetermined periods are successive said predetermined periods. Thus, false alarms may be prevented or reduced based on pattern detection, e.g., leak—no leak, leak—no leak—leak, or a longer pattern. The successive predetermined periods may comprise for example successive night periods, e.g., starting at 3 am on each of successive nights. In an embodiment, the leak/no leak decision may not be a binary decision. It could be based on an average of the temperature difference over several measurements. For example, if there are two successive measurements, one where the temperature difference is significantly above the threshold and one where it is only slightly below, the average difference may then be above the threshold and the alarm can be raised. Alternatively the detector may monitor the average temperature difference for a given installation, and if it changes by an amount above a threshold, then to raise an alarm.

An embodiment of the leak detector comprises an alarm generator to output an alarm in response to at least one said leak detection, the leak detector configured to detect if the sensed pipe temperature is substantially constant for a predetermined time duration at a temperature that differs from the sensed ambient temperature by more than a predetermined amount and, in response to the detection, immediately trigger the alarm generator to output a said alarm, preferably wherein said predetermined period is at least one hour. Such an embodiment may be advantageous for detecting an undesirable high flow condition, e.g., with water flow similar to for running a bath. (In comparison, a low flow condition occurs for example where a tap is left dripping). The embodiment may be of advantage for detecting a burst pipe. For a burst pipe or other high flow condition detected by such an embodiment, the pipe temperature may tend to the maximum (minimum) draw down temperature depending on whether the water temperature is higher (lower) than ambient and may on the day. Some example values of the substantially constant temperature difference may be 2-3 degrees, e.g., 1, 2, 3, 4, 5 or 10 deg C.

There may further be provided the leak detector comprising an alarm generator to output an alarm in response to at least one said leak detection, wherein the processing means is configured to detect when a change in the sensed pipe temperature immediately follows a predetermined time duration during which the sensed pipe temperature tracks the sensed ambient temperature, wherein the predetermined time duration preferably comprises at least a predetermined number of 24 hour periods (e.g., seven, i.e., 1 week) and the predetermined number is at least two, wherein the processing means is configured to immediately trigger the alarm generator to output a said alarm in response to a said change detection, preferably wherein the change detection comprises a detection that a pipe temperature (preferably relative to ambient temperature) change and/or a rate of change of the pipe temperature (preferably relative to ambient temperature) exceeds a respective predetermined value. The temperature tracking may be caused by a no flow condition and may be identified by detecting there is a substantially constant, e.g., zero or more, offset between the pipe and ambient temperatures over the predetermined time duration. Such a leak detector may be effectively establish that a user is on holiday (wherein there may be no flow so that the pipe and ambient temperatures track) and on this basis establish that a new flow detection is likely to be caused by a leak. This may be particularly advantageous for detecting a likely burst pipe. Example values of such an offset between the pipe and ambient temperatures are, e.g., 2-3 degrees, e.g., 1, 2, 3, 4, 5 or 10 degrees.

The leak detector may comprise an alarm generator to output an alarm in response to at least one said leak detection, wherein the processing means is configured to detect a crossing point of the sensed pipe temperature and the sensed ambient temperature, and to disable (for at least a predetermined time duration and/or for the duration of a concurrent predetermined period during which monitoring for a leak is occurring) the leak alarm generator when such a crossing point is detected. This may prevent or reduce a false alarm that may otherwise be generated due to a thermal mass lag effect.

Preferably, the leak detector is configured to process an output of the second temperature sensor to filter out periodic temperature changes during a said predetermined period and to thereby provide a filtered pipe temperature profile, wherein the sensed pipe temperature for use in leak detection is a temperature of the profile, preferably wherein the filtering reduces an effect of a Torbeck valve on a said leak detection. Such periodicity may be every e.g., 5 or 10 minutes, or every, e.g., 5 hours. To identify such periodic temperature changes preferably a mask is applied to filter out periodic changes that may occur from normal daily water usage, e.g., events occurring every 24 hrs.

A leak detector according to any one of claims 30 to 45, the leak detector comprising an arrangement having said temperature sensors and the processing means, the leak detector further comprising a remote unit, wherein the leak detector is arrangement to transmit to the remote unit data points comprising at least one of: at least one sensed pipe temperature, preferably including a temperature of the pipe as sensed at the start of a said predetermined period; at least one sensed ambient temperature, preferably including a temperature of the ambient as sensed at the start of a said predetermined period, wherein the remote unit is arranged to vary a said predetermined threshold on the basis of the transmitted data points. Either or both such starts of a said predetermined period is preferably a time where water use was last detected.

There may further be provided a leak detector having an electronic control unit configured to determine whether the device is subject to a repeated heating or cooling from an external heat source or sink, wherein a said heating or cooling comprises at least two successive crossing points of the sensed pipe and ambient temperatures, preferably wherein the electronic control unit is configured to alert a user that it is unable to determine if a leak condition is present.

Generally, the repeated heating or cooling is intermittent. For example, the external heat source/sink may be a central heating system water pipe through which hot water flows intermittently. The crossing points may occur when the pipe temperature rises (falls) to cross the ambient temperature and then falls (rises) to cross back over the ambient temperature. Preferably an ECU of such a fluid flow detector is configured to determine whether the device is subject to the repeated heating or cooling and/or to alert the user that it is unable to determine if a leak condition is present.

Such detection of whether the device, e.g., the second temperature sensor for detecting the pipe temperature, is subject to a repeated heating or cooling may be useful where a water pipe is placed next to a heating pipe, for example when the heating comes on intermittently thus affecting the temperature of the neighbouring pipe being monitored for leak detection. This may be similar to where the pipe is next to e.g. a concrete slab such that the ambient and pipe temperatures may not converge within a predetermined period of time so that it may be more difficult to determine whether or not there is a leak. An embodiment may determine if the pipe temperature is always different to, e.g. sits below, the ambient temperature. In this case the temperatures may not converge due to a leak or continual thermal conduction from the pipe to a high heat capacity object such as ground.

In this regard, it is noted that it is generally necessary or at least advantageous to have seen a convergence between the ambient and pipe temperatures before deciding that a lack of convergence means anything regarding presence or absence of a leak. A preferred leak detection system may therefore be configured to only be able to provide a leak detection alarm (e.g., visual and/or audible notification or alert) if it has previously detected that a predetermined period has elapsed with no flow.

An embodiment comprises a water supply system comprising the leak detector and at least one water pipe, preferably wherein the leak detector is attached to a said water pipe where water enters a building and/or at a stop cock.

Embodiments of the invention may comprise a controller which includes a microprocessor, working memory and program memory coupled to one or more of the components of the system. The or each processor may be implemented in any known suitable hardware such as a microprocessor, a Digital Signal Processing (DSP) chip, an Application Specific Integrated Circuit (ASIC), Field Programmable Gate Arrays (FPGAs), etc. The or each processor may include one or more processing cores with each core configured to perform independently. The or each processor may have connectivity to a bus to execute instructions and process information stored in, for example, a memory.

Embodiments of the invention may further provide processor control code to implement the above-described system and control procedures, for example on an embedded processor. The code may be provided on a carrier such as a disk, CD- or DVD-ROM, programmed memory such as read-only memory (Firmware), or on a data carrier such as an optical or electrical signal carrier. Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog (Trade Mark) or VHDL (Very high speed integrated circuit Hardware Description Language). As the skilled person will appreciate such code and/or data may be distributed between a plurality of coupled components in communication with one another.

Preferred embodiments are defined in the appended dependent claims.

A possible embodiment of the device is described below.

An example of such a device will include two high precision temperature sensors, a power supply and an electronic control unit (ECU) enclosed in a housing which is connected to a pipe. One temperature sensor is positioned such that it is in good thermal contact with the pipe, at sufficient distance from any heat sinks or sources, including the earth or any other conduits or passages that the pipe has passed through, so that they do not unduly heat or cool the pipe, it is also sufficiently close to where the pipe leaves the earth, passage or conduit when so that any fluid flowing in the pipe during a leak does not have time to reach ambient temperature before it reaches the sensor. The other temperature sensor is positioned such that it has good thermal contact with the ambient air in the general region of the pipe temperature sensor, but not so close its measurements will be unduly affected by it. Preferably it is shielded from any heating or cooling drafts or air currents which might affect the values. The sensors are connected to an ECU or microcontroller which monitors the measurements over a period of time to determine whether there is a flow in the pipe. The microcontroller can then issue an alert via a suitable method if flow is present when it is outside the predetermined parameters or is not expected.

Under normal operation (no leaks present), if all taps and valves on the circuit are closed such that there is no flow, the temperature of the pipe (and its contents) will slowly tend to converge to that of the ambient air. For a typical domestic water pipe it will take around 3 hours for it to be within 0.1 C of the air temperature.

If there is a flow in the pipe, the temperature of the pipe will not tend to equal the air temperature. For larger flow rates, the pipe temperature will stay close to the incoming fluid temperature, whereas for slower flow rates, the pipe temperature will stay closer to the ambient temperature than in the other case.

The ECU or microcontroller can be programmed to detect the temperature differences and monitor them over time. It is clearly advantageous that if there is a sudden increase in flow rates caused by say the flushing of a toilet or drawing water for a bath or shower, that the system does not signal an alarm. Following such an event, the ECU will normally be programmed to restart the monitoring period. Advantageously and optionally, the ECU will be provided with means, e.g., clock and/or calendar, to determine the time of day and more preferably, the actual date. The ECU programmed in this manner should be able to determine that a period of low or zero fluid flow is to be expected, as would be the case in the middle of the night.

It will also be apparent that the temperature differences between the ambient temperature and pipe temperature will also vary according to the material from which the pipe is made and its diameter. For larger diameter pipes containing more liquid it will clearly take longer for them to approach and reach ambient temperature than a smaller diameter pipe. Also, it will be appreciated that pipes made from metals such as copper, steel or lead will conduct heat far more efficiently than pipes made from plastics materials. Therefore a different rate of temperature convergence can be expected in view of such differences.

Advantageously, the ECU or microcontroller can be calibrated and set to take account of such variations.

BRIEF DESCRIPTION OF THE DRAWINGS

Embodiments of the invention will now be described with reference to the accompanying drawings in which.

DETAILED DESCRIPTION OF PREFERRED EMBODIMENTS

Embodiments of the invention will now be described in more detail with reference to the drawings in which like references refer to like features in the various figures.

Figure 1:
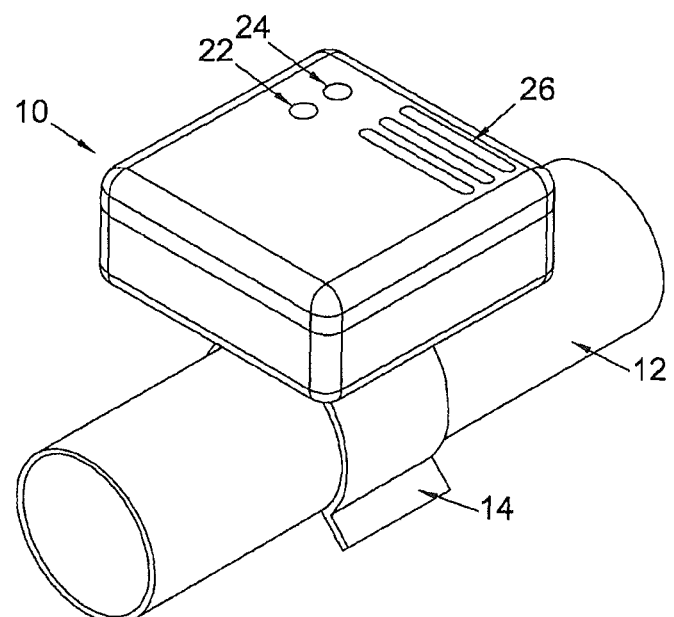
FIG. 1 shows an example of a flow detector device attached to a pipe.

FIG. 1 shows an example of a fluid flow detection device according to an embodiment of the present invention. The device is contained within a housing 10, is attachable to a pipe 12 by means of a biasable pipe clip 14. This particular device is used as a water flow detector for a domestic or office environment. Larger scale devices and housings could be used for a factory, but frequently factories operate for large portions of a day and may not have long enough periods of zero flow for satisfactory operation and require more sophisticated and complex monitoring systems.

Figure 2:
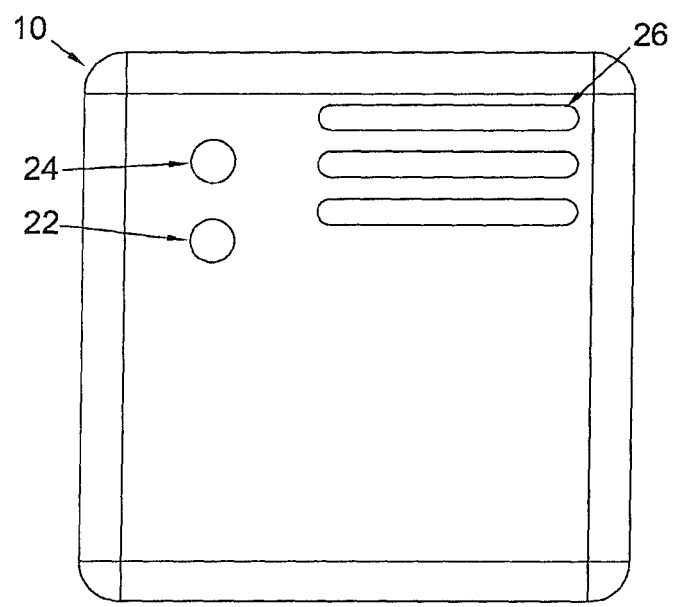
FIG. 2 shows a top view of the detector device.

FIG. 2 shows a top view of the device which may conveniently include indicator or display elements to show the state of operation of the device. These could include a system operation indicator 22 an alarm indicator 24, or a loud speaker 26 from which an audible alarm could be emitted.

Figure 3:
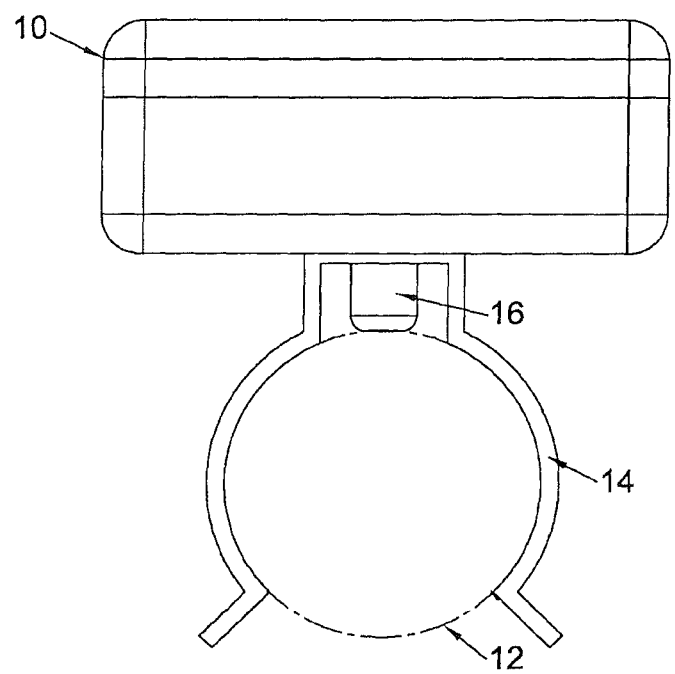
FIG. 3 shows a side elevation indicating how contact is made with the pipe.

FIG. 3 shows a side elevation of the housing 10 secured to a pipe 12 by connector 14. A temperature sensor 16 extends from the case of the housing and is shown contacting the pipe 12 to determine the outer temperature of the pipe 12.

Figure 4:
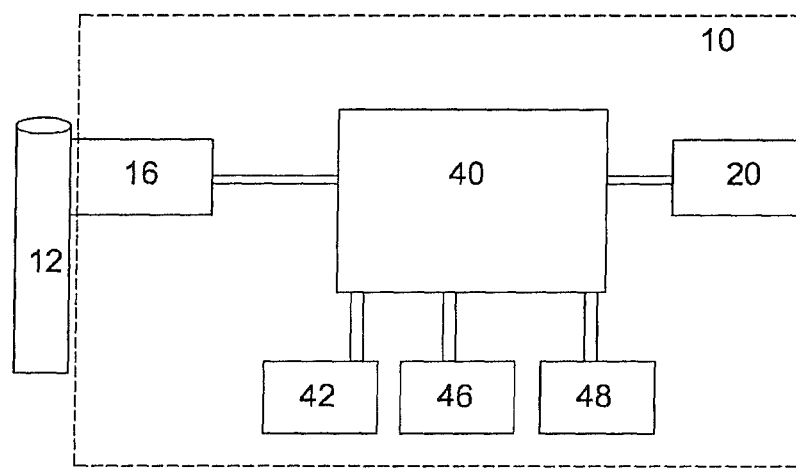
FIG. 4 shows a block diagram of the inter-connection of the components.

FIG. 4 shows a block diagram of the components comprising the device and their inter connections. The housing 10 encloses an electronic control unit (ECU) 40 for monitoring temperatures, time and controlling the device. The device is powered by a power supply 42, normally comprising one or more batteries. The selection of batteries will be chosen to provide long life in the environment in which the device is installed. Temperature sensor 16 is shown as in contact with pipe 12 to measure the temperature of the pipe. Ambient temperature is measured by temperature sensor 20. An alarm unit 46 can include a visible alarm means, typically an LED, or an audible means or driver therefor. For some applications, a wireless connection 48 will also be provided, so enabling the device to periodically transmit data to a remote station and so send an alarm signal when needed. The wireless connection could also receive information or data from a remote station.

In another example embodiment of the invention, the power could be supplied by a mains network. In a further example, a more sophisticated power supply system is provided in which the power supply comprises a mains power supply connected with one or more batteries.

Suitable temperature sensors are for example Resol FKP6 PT1000 temperature sensors. Other devices which have been found to work well can be found in the class of PT1000 platinum sensors.

Figure 5A:
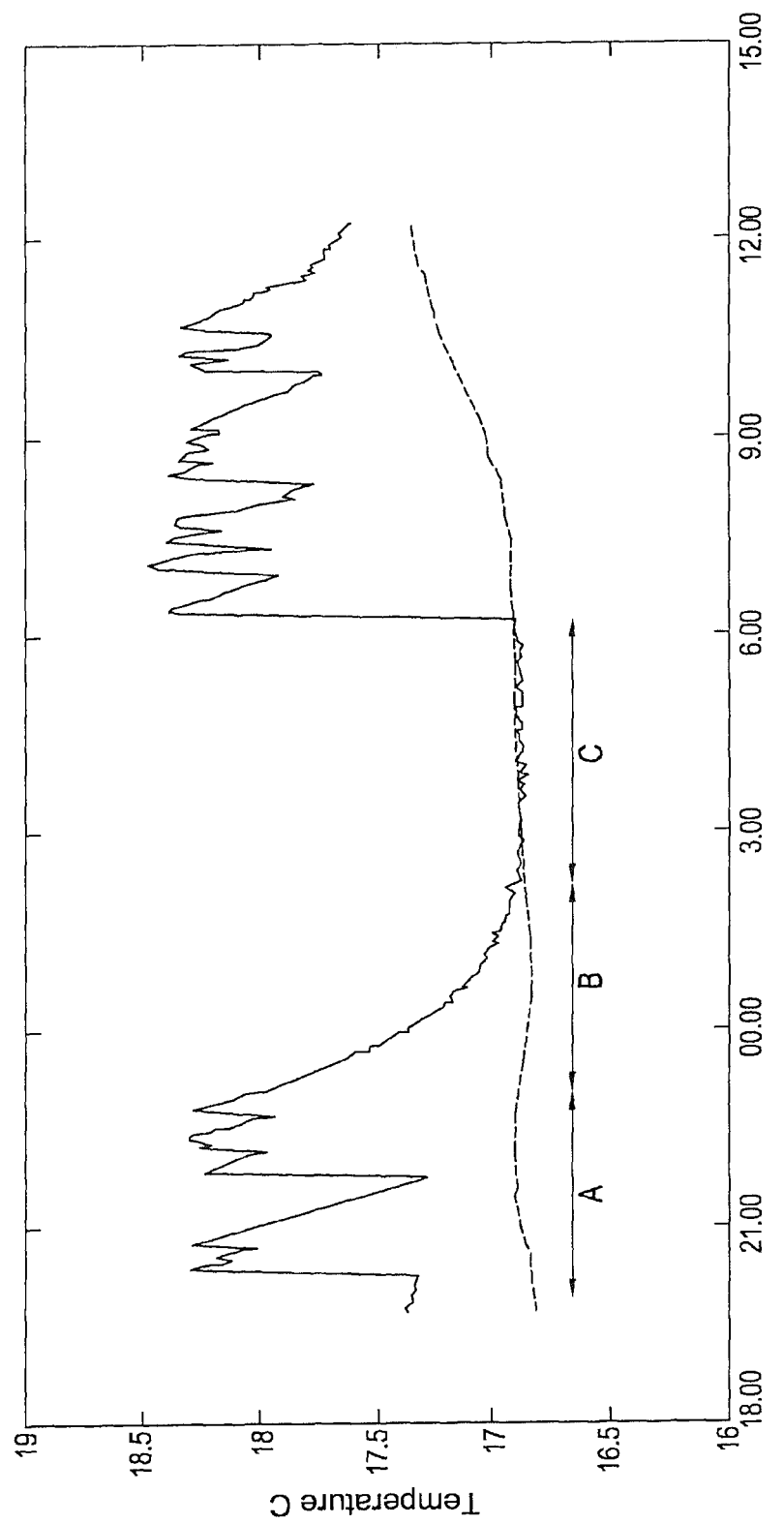
FIG. 5a is a graph showing the temperature of the pipe and the ambient air over a 5 hour test period with no flow in the pipe where the water is warmer than ambient.

FIG. 5a shows a graph of the temperature measured by each of the sensors over a period of time. The graph shows temperature along the Y axis, and time along the X-axis. The dashed line is a trace of ambient temperature over a selected measurement period, in this example 2-3 hours. The solid line shows how the temperature of water in the pipe varies. In region A, a significant flow has been occurring and the water temperature is significantly higher than the ambient temperature. (This can occur in some tropical climates and late in summer when the ground temperature has risen and is consistently (during the course of a day or so) higher than the general air temperature. The spikes indicate how the temperature has risen sharply as a significant draw down occurs and show the temperature has begun to fall towards ambient. This draw down could be a flushing of a toilet or water for a basin or sink.

In Region B, the water temperature can be seen to fall towards ambient.

In Region C, the temperatures are considered to be within the predetermined conditions and so equal. This condition would indicate there is no flow of water in the system.

Figure 5B:
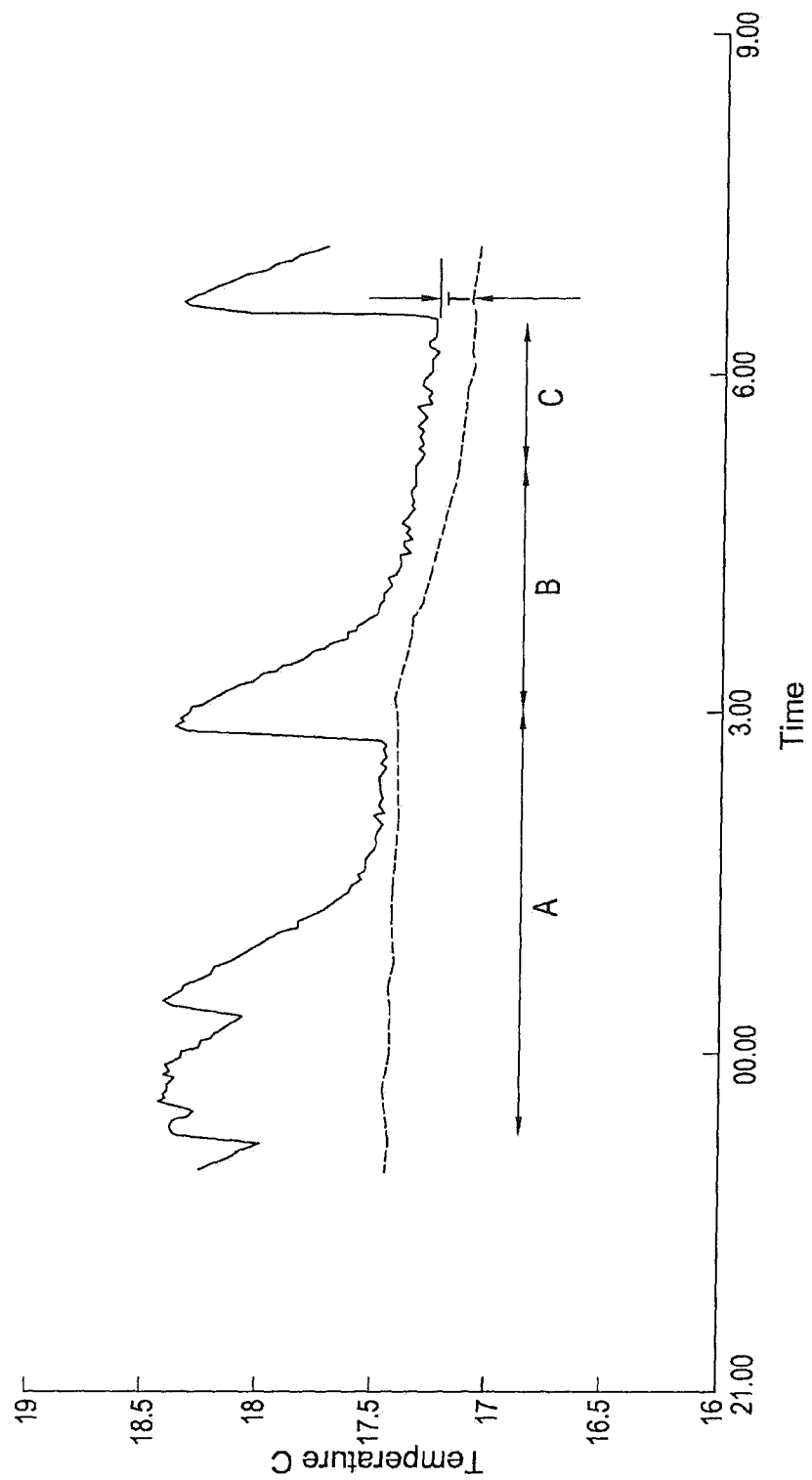
FIG. 5b is a graph showing the temperature of the pipe and the ambient air over a 5 hour test period with a small amount of flow in the pipe where the water is warmer than ambient.

FIG. 5b shows a similar situation to the one in FIG. 5a, but in this example, the two temperatures never quite converge, as can be seen in all regions. From this it can be concluded that there is always a flow and there is a leak in the system.

Figure 6A:
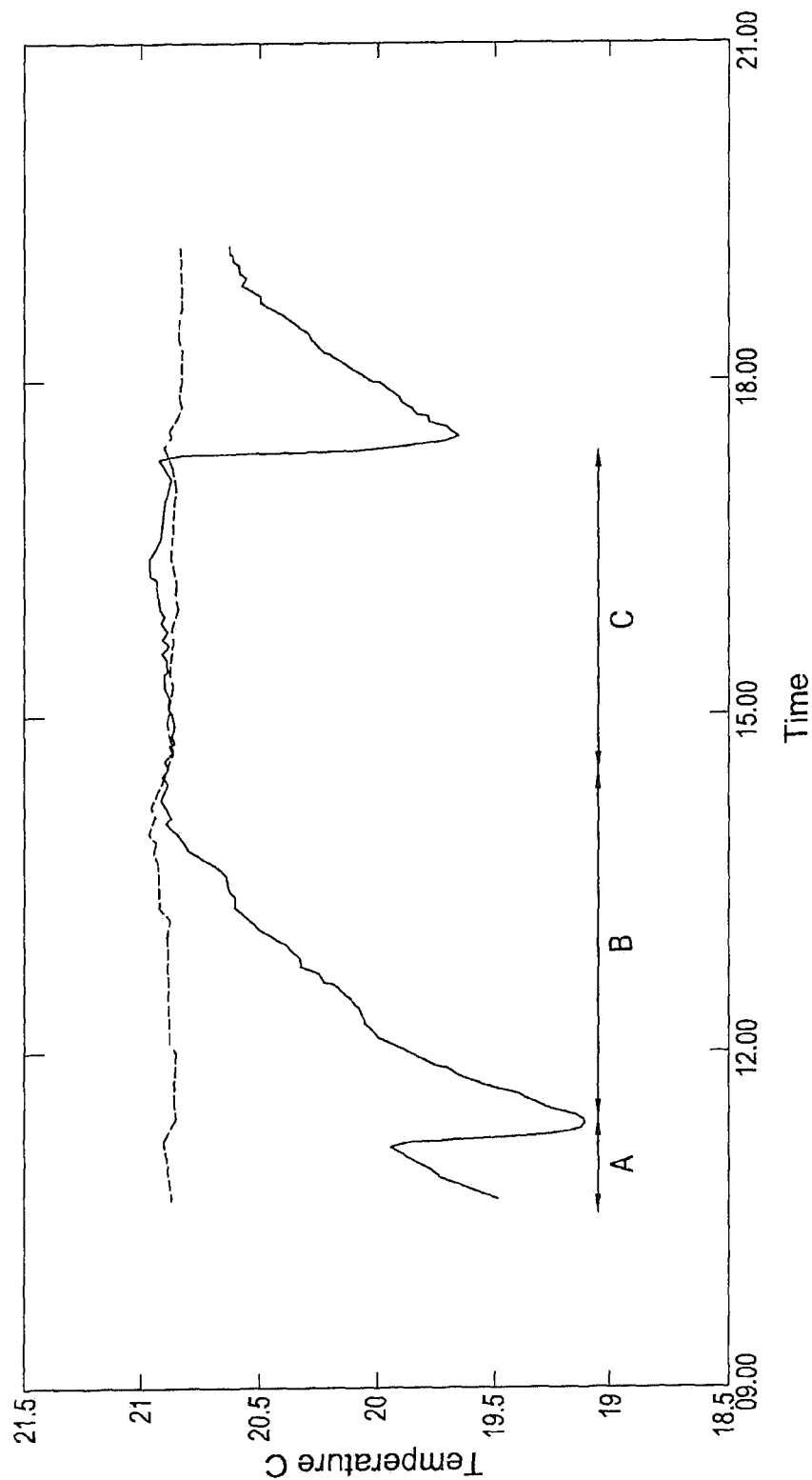
FIG. 6a is a graph showing the temperature of the pipe and the ambient air over a 5 hour test period with no flow in the pipe where the water is warmer than ambient.

FIG. 6a shows a graph of the temperature measured by each of the sensors over a period of time. The graph shows temperature along the Y axis, and time along the X-axis. In this example the ambient temperature shown by the dotted line is higher than the incoming water pipe temperature shown by the solid line. Such situations can arise in cold or temperate climates where ground temperatures can be and frequently are lower than the ambient air temperature. In region A tap on off events can be seen as indicated by the spikes in the pipe temperature. In region B the pipe temperature is rising towards the ambient temperature. In region C the two temperatures are more or less convergent, and so satisfying the criteria set out that the temperatures must be within narrow bands. This convergent set of temperatures would indicate that there is no leak in the system.

Figure 6B:
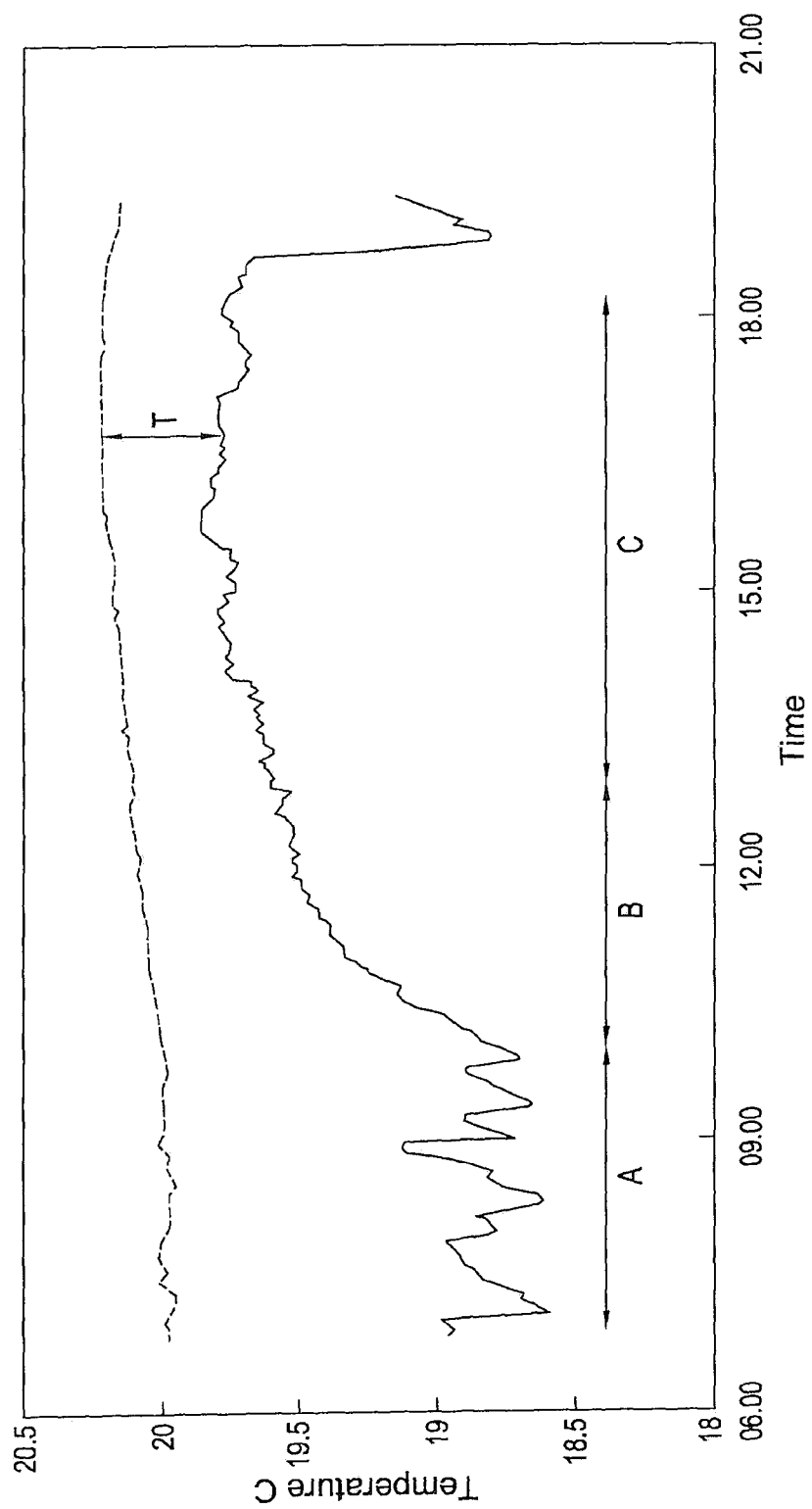
FIG. 6b is a graph showing the temperature of the pipe and the ambient air over a 5 hour test period with a small amount of flow in the pipe where the water is cooler than ambient.

FIG. 6b shows the ambient temperature (shown by the dotted line) is higher than the incoming water pipe temperature shown by the solid line. The various spikes in Region A show how the inlet water temperature falls as water is drawn off through the system, and then rises towards ambient, until the next draw off, when it falls again. In region B, there is a prolonged period without a significant draw off of water. However, as can be seen in Region C, the two temperatures do not converge closely within the predefined limits, always maintaining a difference of temperature T. Providing this temperature difference (or temperature) is greater than a predetermined value, which can vary according to the geographical and physical location of the device, it can be assumed there is a leak in the system. If it is a significantly large temperature difference (or temperature), as in this example, it can be assumed there is a reasonable flow rate of leak—rather than just a dripping tap. In some regions, a temperature difference of approximately 1° C. will be expected, but more commonly the temperature difference will be expected to remain below approximately 0.3° C. and preferably 0.1° C. for a no flow condition to exist.

An audible alert—such as a loud speaker will normally be used to provide the alert signal. Optionally the device will also be provided with a wireless or other communications link. The wireless link can be deployed to receive commands and transmit information to a remote station, either continuously on a predetermined period basis.

It is therefore possible to discriminate between the two main conditions determined by the device, flow and no flow. By monitoring the temperatures during a period when no flow is expected, any detected flow indicates that a possible leak is present in the system. The leak may be due to pipe or pipe joint failure, dripping taps, failed cisterns in toilets or any other condition which would result in continuous water flow in a pressurised plumbing system.

In one possible embodiment of the device, the device operates for 24 hours a day on a domestic water main. Typically at night there will be no water flowing in the pipes as no taps will be used and appliances such as washing machines will have finished their cycles.

The device is programmed to monitor and recognise a pattern in temperature change in the detectors. After a period when there are no sudden changes in pipe temperature (due to taps switching on) have stopped or appliances being used the ECU can be programmed to determine if the pipe temperature has not changed rapidly or significantly and compare it to the ambient temperature. It also recognises that the ambient air temperature is stable (within limits) so the device is not being adversely affected by other heat sources (for example being near a radiator or hot water pipe).

The ECU can be programmed to monitor the changes measured by the temperature detection means of the temperature of the water pipe and the ambient air. The water pipe temperature will generally be an exponential approach towards air temperature with a slope within certain limits. In a "no leak" condition, the asymptotic difference between the pipe and air temperatures will be below a calibrated value, between 0 and 0.5° C., typically between 0 and 0.3° C., but preferably between 0 and 0.1° C. If the asymptotic temperature difference is higher than these values for greater than a predetermined period of time, say an hour or more, then there is usually flow in the pipe indicating a leak.

In another possible embodiment, the ECU in the detector may determine whether the device is subject to a constant heating or cooling from an external heat source or sink. In this case it may alert the user that it is unable to determine if a flow condition is present.

In another embodiment, the device may detect that its sensors are giving invalid values due to an error or component failure and alert a user to the fault.

On detecting a leak the device may alert a user by one of many different means typical of such domestic alarms. For example it may use an audible alert. Alternatively, or additionally, it may also include a light or a display. To avoid waking a user at night, it may wait until it next detects flow (because a user has woken up) before issuing an alert.

The device may also issue alerts and other information via a remote telemetry system. This could be one of any such technologies known in the art. For example using a cellular phone modem, an internet connection, a home automation protocol (e.g. Z Wave), a landline phone modem, an acoustic modem or any other such transmission mechanism.

In another possible embodiment, the device detects the sudden changes in pipe temperature relative to air temperature which are characteristic of taps turning on or toilet flushes. It can be calibrated to estimate frequency and quantity of water usage. Dips (or peaks) in the pipe temperature show water usage. Counting short dips shows the frequency of water usage for low use items (hand washing, toilet flushing). The height of the dips give an estimate of the incoming mains water temperature. When the pipe temp is approximately the same as the input water temperature for an extended period of time, we can assume we have constant flow over that time period. This indicates either shower, bath filling or other extended use such as irrigating a lawn.

According to another feature of an embodiment, the ECU restarts the determination of the predetermined period of time if the difference between the ambient and pipe temperatures suddenly changes to be greater than the predetermined value. Thus if a sudden sharp difference of temperature is detected between the two sensors, the ECU can be programmed to determine that a flow of water has occurred and so restart its monitoring process.

According to another feature of an embodiment, the ECU determines if the temperature difference between the ambient and pipe sensors is tending to or approximating to an exponential approach to 0 and if so indicating there is no flow in the pipe system. If the two temperatures do not converge exponentially after a period of say an hour, the device can be programmed to generate an alarm signal.

In yet another possible embodiment, the device can be programmed to note the absence of water usage over a period of time. This information may then be used to check on the presence and activity of a person in the home. For example if an elderly or vulnerable person has not used water for a predetermined period, such as a day, it may indicate that they have a problem and a carer can be alerted.

In yet another possible embodiment, the device can be programmed to rank a water leak rate according to size of the temperature difference (assuming it has reached a constant or substantially constant difference for a period of time,) thus providing an indication of the severity of the leak. If the pipe temperature stays at close to the estimated incoming water temperature (using the dip height method above), then the leak is a reasonably high flow rate. If it is within 0.5° C. or so of the air temperature, it is typically a dripping leak. Temperatures in the middle indicate a medium flow leak.

In yet another embodiment, the device may have a 'holiday' mode that can be set by a user who knows that no water flow should be expected for e.g. 72 hours or 14 days or however long a user is absent. If any water flow is detected during that period, an alert would then be triggered.

In a further embodiment the device may connect to a service which could alert the user (e.g. by text, email or smartphone app) of the presence of leaks automatically, or it could send the alert directly to a maintenance company. The service may also alert a service provider or a plumber who could then check the leak. The device could also contact for example a neighbour who may check on a property.

Figure 7:
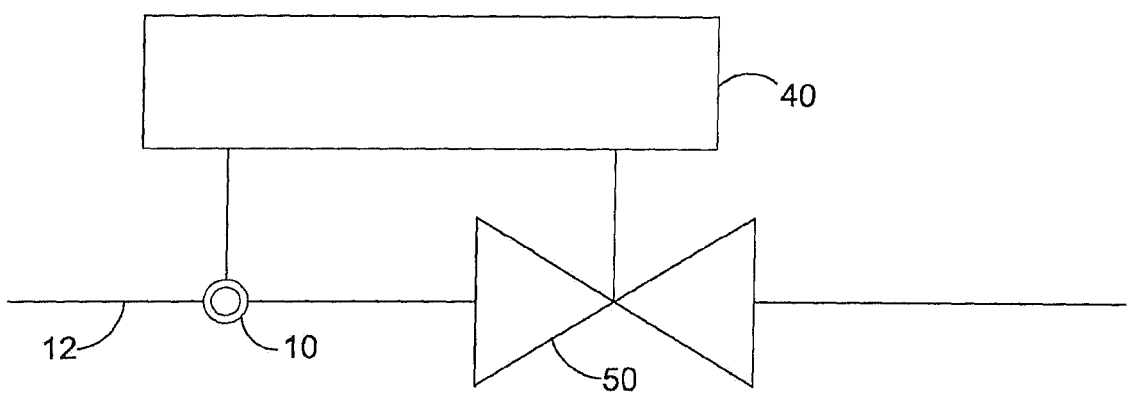
FIG. 7 is the block diagram of the system where a shut off valve is used to shut off the water supply in the event of a leak being detected.
Figure 8A:
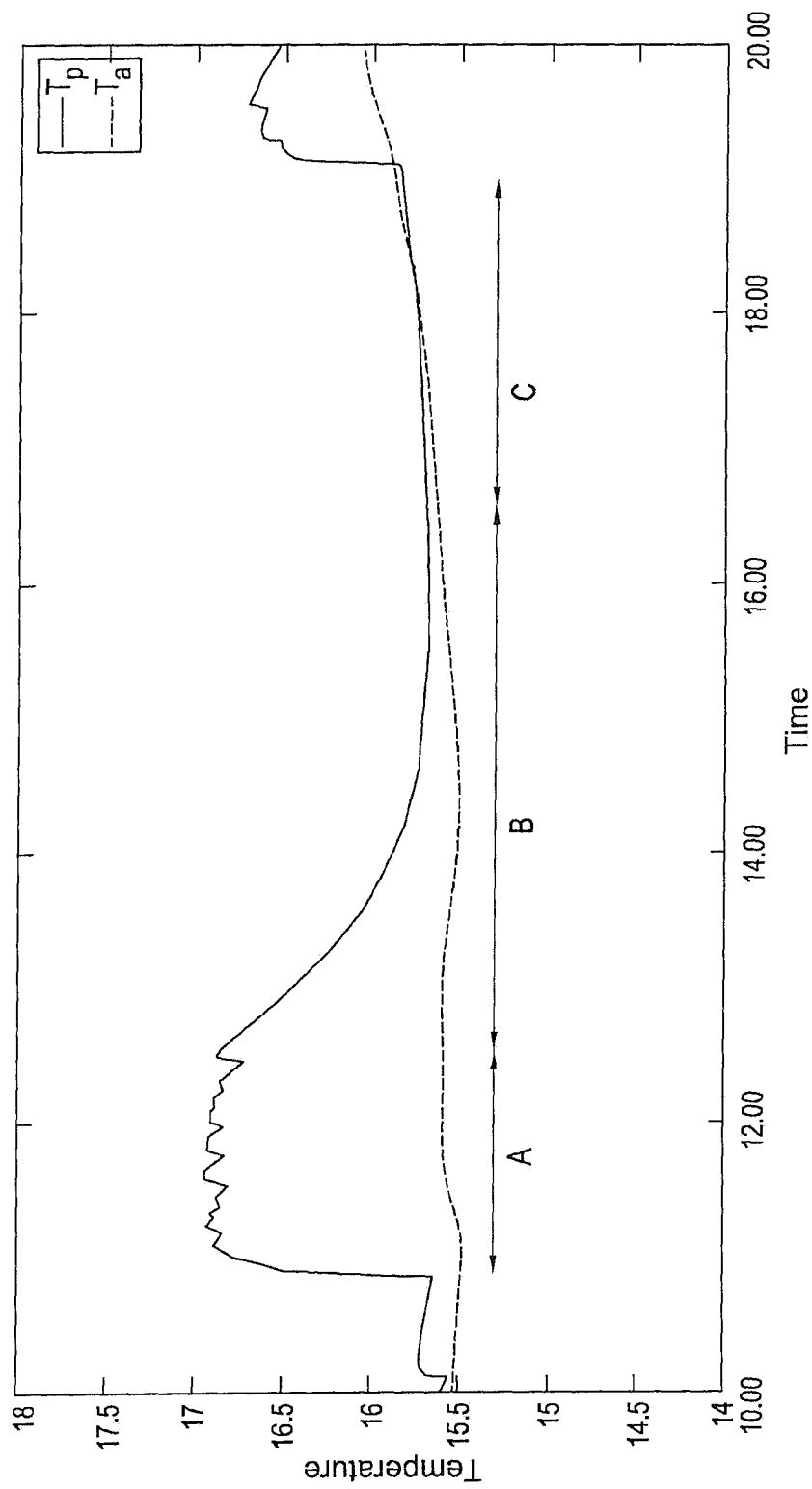
FIG. 8a is a graph showing the temperature of the pipe and the ambient air over a test period with no flow in the pipe where the water is warmer than ambient.
Figure 8B:
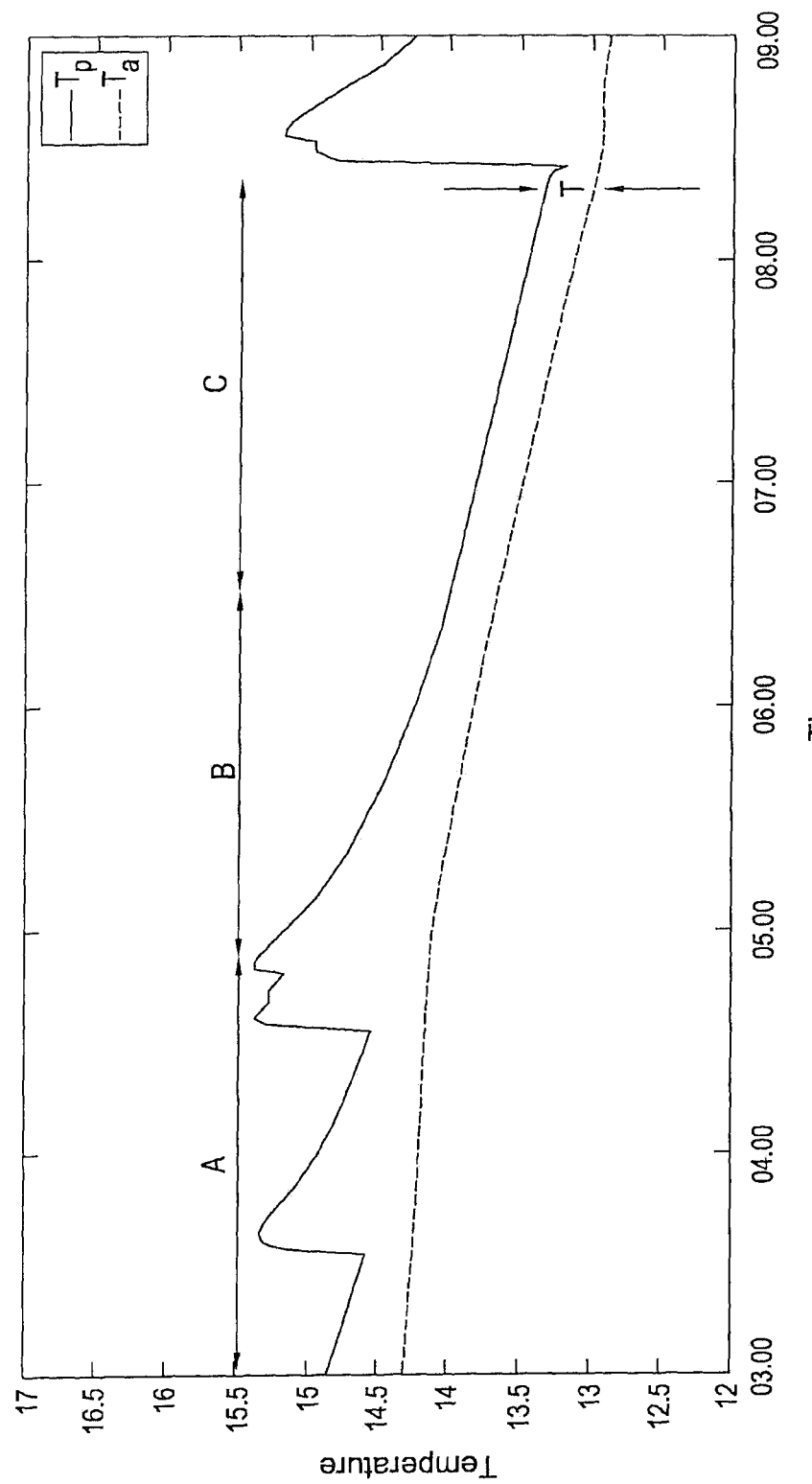
FIG. 8b is a graph showing the temperature of the pipe and the ambient air over a test period with a small amount of flow in the pipe where the water is warmer than ambient.
Figure 9A:
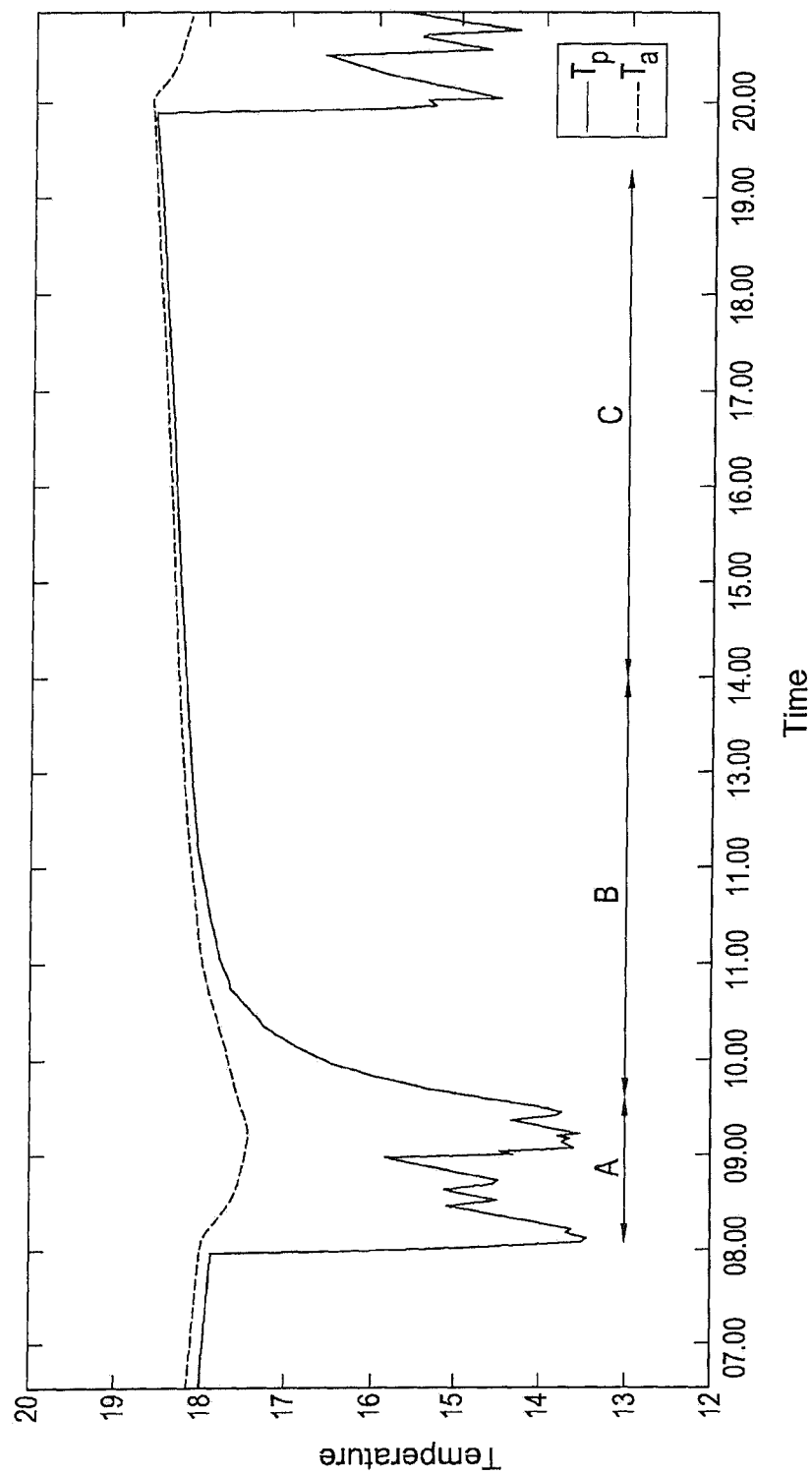
FIG. 9a is a graph showing the temperature of the pipe and the ambient air over a test period with no flow in the pipe where the water is warmer than ambient.
Figure 9B:
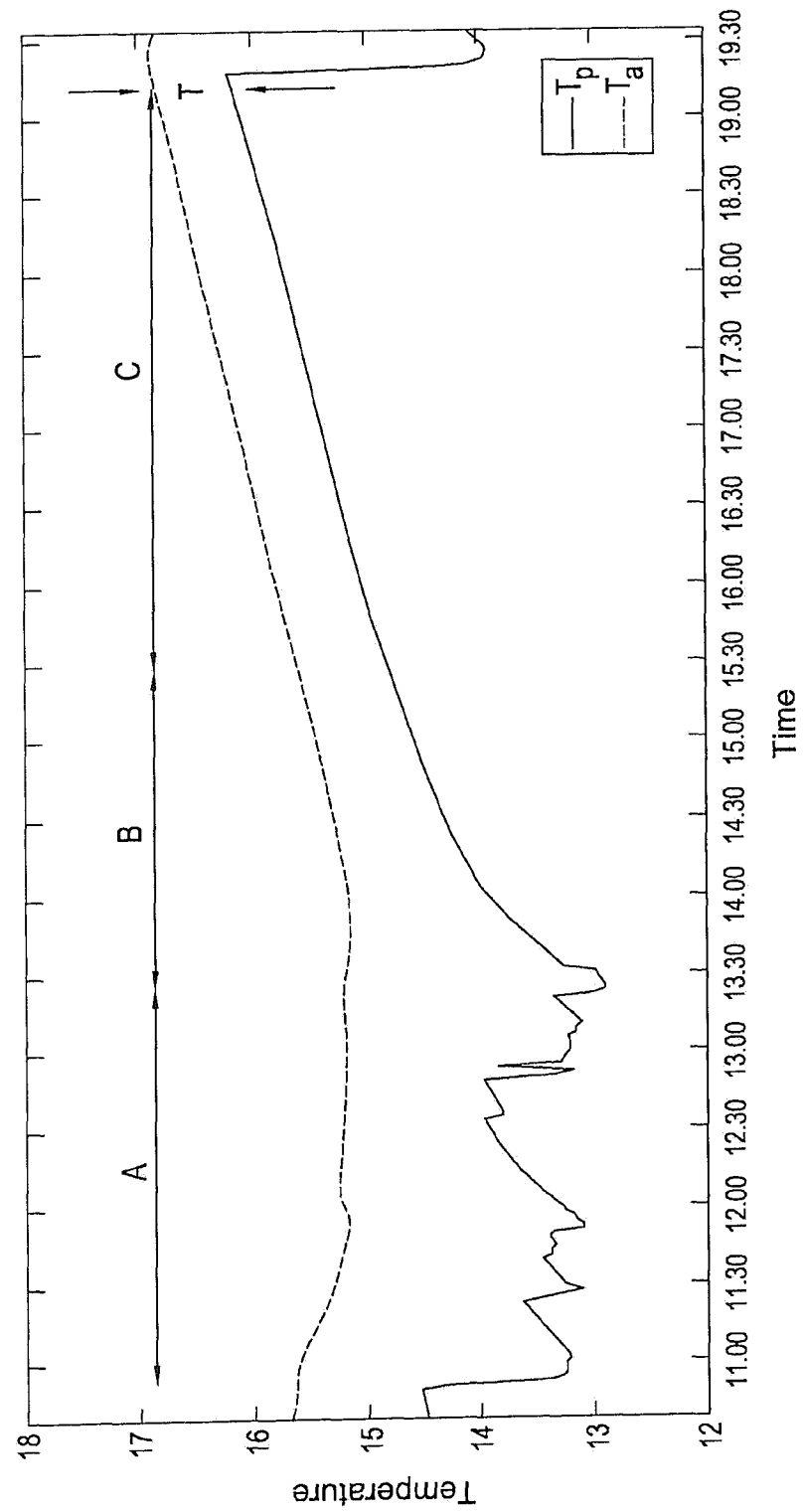
FIG. 9b is a graph showing the temperature of the pipe and the ambient air over a test period with a small amount of flow in the pipe where the water is cooler than ambient.

FIG. 7 shows a possible additional feature in which the device is connected to and controls a powered shut-off valve. The device may then, depending upon the estimated severity of the leak, shut off the water supply in response to a leak. It could also shut-off the water when the device is in holiday mode, or only if any flow is detected when it is holiday mode. FIG. 7 shows a device 10 monitored by the ECU 40 and fitted to the pipe 12. If a leak is detected or there is flow for more than a predetermined period of time, then the controller can shut off the supply in pipe 12 using the valve 50.

In this embodiment, the user may also be able to shut off the water for example using a remote switch, or another interface such as a smart phone app.

In an alternative and further embodiment the ECU may be configured to monitor flow and signal an alarm if there is no flow for a given period of time. For example, the alarm may sound if there is no flow for more than 36 hours.

In another embodiment the alarm signal may be sent if there is no flow detected for periods between 18 and 24 hours. This embodiment could be particularly useful as an aid to monitor people living in sheltered or supported accommodation where lack of water flow for an extended period could be an indication the person or persons are in need of help. Clearly, a balance needs to be struck between having a period that is not too long so that the person is not left for too long if help is needed and a period which is too short that it leads to false alarms.

An alarm signal can be generated if the predetermined conditions for flow (or lack of flow) are met. The alarm could be an audible alarm generated by the audible signal generating means on the device itself. Alternatively or additionally, a visible alarm signal could be generated.

It can be expected that normally devices according to embodiments of this invention will be located close to the place where the water inlet enters a building and so are frequently located in cupboards, cellars, possibly even at a remote stop cock, and so not conveniently visible. It is therefore convenient for the device to be fitted with a wireless transmitter means to transmit the alarm to a station where it is more conveniently received and monitored. Alternatively the device may be located outside in a meter pit, in which case a wireless transmitter may also be more convenient as an audible alert may not be heard.

Advantageously, the wireless transmitter can also be programmed to transmit additional information from time to time. Such information could conveniently include information about flow rates and periods of zero flow, information about the state and condition of the batteries to provide low battery warnings, other error messages to indicate sensor errors or the like.

Preferably the power supply is a battery or set of batteries selected to provide long maintenance free life in an environment in which the device operates. However, it could advantageously be connected to a mains power supply.

In yet another alternative arrangement, the power supply comprises a mains power supply connected to a battery pack up system to provide power in the event of mains failure.

The following describes features, any one or more of which may additionally or alternatively be present in any embodiment such as an embodiment described above or below.

Indoor Usage

Generally, the ECU, or at least the pipe temperature sensor, may be connected to an indoor pipe, e.g., a water pipe preferably close to where the pipe enters a building (for example through the floor). In this regard, it is noted that the pipe may be close to additional heat sources, e.g., other plumbing for example carrying hot flowing water such as for a central heating system.

Thermal Mass Lag effect

In some circumstances, a high heat capacity local object, e.g. a concrete block and/or other plumbing as above, may result in a different temperature versus time progression of the pipe temperature relative to the ambient pressure during a no flow period. This may lead to the pipe temperature crossing the ambient, e.g., air, temperature as mentioned above, and may restrict the ability to confirm presence or absence of a leak.

In the event of a residual temperature difference after a no flow period of three to four hours for example, it is preferable that no alarm (e.g., visual and/or audible notification or alert) indicating a leak is generated if the residual temperature difference is due to thermal mass lag. Thus, if a crossing point is detected then it may be preferable to disable such an alarm. For example, the alarm may be disabled regardless of whether it is detected that the air and pipe temperatures are converging (see leak detection methods below based on time gradient of pipe temperature). An embodiment may be configured to detect a crossing point and thus to conclude that the mass lag effect is occurring, and to enable or disable a leak alarm accordingly, for example for a predetermined period of time until monitoring for a leak may restart.

Variable Leak Detection Threshold

Where in an embodiment a leak condition is determined using a threshold, for example at least based on a temperature difference between the pipe and ambient relative to a predetermined threshold for a predetermined period as described above and/or based on a temperature gradient and predetermined threshold as described below (see equations 4a, 4b, 6a, 6b below), it may be advantageous to vary such a threshold(s) for example according to the time of year. Regardless of whether or not the flow detection system, e.g., ECU thereof, is able to track the time of year for example by means of an internal electronic calendar, the threshold may be varied based on a starting difference between the pipe and ambient temperatures.

The starting temperature difference may be the difference in readings of the two temperature sensors at the start of the predetermined period used to monitor for a leak. The start of the predetermined period may be identified when it is detected that the difference between the temperatures suddenly changes at a rate above a pre-determined value and/or may be the last detected time point where the temperature versus time gradient of the pipe temperature reverses sign such that the pipe temperature tends towards the ambient temperature.

If the starting temperature difference is smaller, then a lower threshold may be applicable. For example, if the starting temperature is 4° C. then a pre-determined threshold may have a value of 0.3° C., or if the starting temperature difference is 0.5° C. then the threshold may be 0.1° C.

Calibration

Where in an embodiment a leak condition is determined using a threshold, for example at least based on a temperature difference between the pipe and ambient relative to a predetermined threshold for a predetermined period as described above and/or based on a temperature gradient and predetermined threshold as described below (see equations 4a, 4b, 6a, 6b below), the embodiment may further be configured to perform a offset procedure similar to a calibration. This may be advantageous in view of the potential scenario that the pipe temperature does not approach the ambient temperature at least within the predetermined period because of the thermal lag effect of a local object having significant thermal mass capacity.

Where an embodiment knows that the pipe should have no flow in the absence of any leak, for example based on a communication from a remote entity and/or because it has determined that a stop cock coupled to the pipe is off, the embodiment may determine if there is any residual temperature difference between the pipe and ambient and, if there is, adjust, e.g., increase or decrease, the pre-determined threshold accordingly. Thus, a form of calibration procedure or adjustment may be performed. Alternatively, in such a case where an embodiment determines if there is any residual temperature difference between the pipe and ambient, the embodiment may alert the user, e.g., by a visual and/or audible signal or notification, that the embodiment is unable to detect a leak and/or that the attachment to the pipe (e.g., at least the pipe temperature sensor) needs to be moved to a different position on the pipe, e.g., away from the ground.

Similarly, a calibration procedure may be carried out for example in a factory before delivery to a user, to reduce any effects due to mismatching of the temperature sensors. An offset to be applied to any determined temperature difference on which a leak status may be detected may be determined by placing the unit in a thermally insulated environment, e.g., insulated box, and waiting for a relatively long duration e.g. six hours, before measuring any temperature difference between the sensor readings and adjusting the offset accordingly. This may be performed by a test mode of the unit when the unit is first powered up.

Initiating Leak Detection Operation

An embodiment may be configured to detect when the unit is mounted on a pipe such that operation for monitoring for any leak can be started. The unit may be configured to wait until a sudden change in pipe temperature relative to the ambient temperature is detected, preferably repeatedly such as at least three times in 24 hours. The unit may then effectively know that it is in use, i.e. no longer separate from a pipe to be monitored.

Such a feature may give confidence for example to an insurer that any readings or notifications arising from the unit relating to leak detection have resulted from events occurring while the unit was fitted to a pipe.

The start of leak detection operation may be indicated by communicating this to a remotely located control entity and/or may be recorded internally within the unit, preferably recording the date at which the unit was mounted onto the pipe, or incrementing an internal timer so the total time that the device has been fitted to a pipe is known.

Alarm Re-Set

An embodiment may have a re-set button to allow a user to deactivate an alarm (e.g., visual and/or audible notification or alert) that has been activated in the event of the system/device indicating a leak. Preferably, the system, e.g., ECU, is configured to store internally and/or communicate externally that the alarm has been re-set (e.g., including a time of the re-set), and may further store and/or communicate when the alarm has been re-set (e.g., including a time of the re-set). This may allow determination for example by an insurer of when the alarm has been re-set but no call out for attending to a potential leak has been initiated. The re-setting of the alarm may be communicated, e.g., wirelessly, to a remote entity.

Alarm Filtering

A preferred embodiment does not provide an alarm, e.g. notification to the user and/or an audible and/or visual indication by the unit, every time a potential leak is detected. Such an alarm may be provided only when a potential leak detection occurs repeatedly on each of a pre-determined number of periods when no flow would be expected in the absence of a leak, e.g. three night time such periods.

Similarly, if a temperature pattern is detected having transition(s) corresponding to at least one leak-no leak transition during each of a predetermined number of such periods then no alarm may be generated. Such a pattern may merely indicate that a user has a tendency to sometimes leave a tap dripping and not fully off and later to turn it off fully, for example. Preferably, no alarm is generated until at least seven night-time periods (or other periods of no flow expectation during a respective 24 hour periods) have occurred.

Burst Pipe Indication

An embodiment may be configured to detect when the pipe temperature stays substantially constant at a temperature that differs significantly by a predetermined amount at least from the ambient temperature. In this case, the pipe temperature may have previously varied according to fluid (e.g. water) usage but then remain at the substantially constant temperature without beginning any rise towards the ambient temperature. The substantially constant temperature may be detected as corresponding to a water temperature estimated based on the preceding variations according to usage.

If the pipe temperature remains at the constant temperature for a predetermined period, preferably longer than the longest period of usage expected for full flow such as when a user is washing a car (e.g. longer than 1 hour), this may indicate a burst pipe condition. Preferably, the detection of the substantially constant temperature for the pre-determined period results in the unit immediately issuing an alarm (e.g., visual and/or audible notification or alert). It is preferable in this case that the generation of a leak alarm is not disabled even for verification over more than one 24 hour period. In other words, preferably no verification is to be performed before issuing an alarm in the case of a potential burst pipe detection.

Holiday Mode

An embodiment may be configured to detect when a pre-determined number of, e.g., 24 hour, periods have passed with no flow, for example encompassing seven nights. Such no flow may be detected by determining that the pipe temperature tracks the ambient temperature throughout the predetermined number of such periods. If such an extended no flow period has occurred and the embodiment subsequently detects a sudden change in pipe temperature, for example indicated by a rate of change of pipe temperature greater than a pre-determined amount or a change in magnitude of pipe temperature greater than a pre-determined amount preferably over a pre-determined minimum period such as 60 minutes, an alarm (e.g., visual and/or audible notification or alert) may be generated due to the risk of the change indicating a burst pipe. Preferably no delay e.g. due to verification, is allowed before such an alarm is issued.

Torbeck Valve

A property may have one or more valves that allow for automatic re-filling of tanks. Such a valve is for example a Torbeck valve for re-filling the tank or cistern of a toilet. The valve may have hysteresis built in such that it allows flow intermittently, e.g. periodically, for example every few hours. An embodiment may be configured to detect a repetitive, e.g., periodic, flow pattern corresponding to such a valve. Such a pattern may be detected from corresponding changes of pipe temperature. The embodiment may be programmed to filter out such changes from the pipe temperature profile to be monitored for leak detection relative to the ambient temperature. In this way, false leak alarms may be reduced or prevented.

Remote Communication

An embodiment may output a minimum of data points from temperature profiles of the air and pipe and send these to a remote entity for determination of a leak/no leak status. Such data points may comprise the ambient temperature, pipe temperature, starting temperature and/or temperature-time gradient(s) of the ambient and/or pipe temperature profiles at the time point when the flow was last detected, e.g. water last used. Such data points may be transmitted, e.g. wirelessly, to a remote control unit that decides if a leak has occurred based on those data points. This may be advantageous where the remote system decides what should be an appropriate predetermined threshold of temperature difference, for example depending on weather patterns/forecasts. The remote entity may adjust such a threshold on the fly for example in case of a heatwave where the ambient temperature is of the order of e.g. 30° C. and the pipe temperature is therefore not able to catch up during the predetermined period.

By varying such a threshold remotely, the remote system may be able to ensure that all devices are disabled from providing any leak alarm and/or ensure that any such alarm is ignored. Such remote control of the alarm process may be advantageous where sufficient data on preceding weather conditions is not able to be programmed into a leak detection unit mounted on a pipe. By providing the leak detection remotely, the system has some flexibility.

Taking into account that a leak detection may not necessarily be in radio communications at all times with a remote entity, a leak detection unit may have two modes of operation. In a first mode where radio communications are possible, the remote system may decide based on data points from the leak detection unit when an alarm is to be generated. In another mode, the unit detects that it is out of radio communication and is then configured to make decisions on alarms internally. An embodiment of the leak detection unit may have an indicator for indicating to the user whether or not the unit is able to perform radio communications with the remote entity. Where the unit is not in radio communications, it may be configured to provide notification to the user, e.g. to the user's mobile phone, to inform that the unit is operating in the independent, isolated mode.

In a preferred embodiment, data may be sent to a remote unit wirelessly, e.g., using Sigfox® (this may be advantageous where there are bandwidth constraints). A unit that is local to, eg., attached to, the pipe may look for smooth regions where we can check for leaks (for example, it may look to (re-)start a predetermined period each time a water usage/flow is detected), then a predetermined threshold for leak detection may be adjusted at the remote unit to allow for temperature variations, desired sensitivity of the detectors, and/or to classify the leak according to severity.

Data that may be sent using, e.g. Sigfox®, may comprise for example: message type; message count; indication that ambient and pipe temperatures have crossed; pipe temperature sample(s), ambient temperature sample(s); indicator of time interval between each pipe temperature sample; and/or battery voltage.

Where more bandwidth is available, the ambient/air and pipe temperatures may be sent to the remote unit at every sample point. These may be batched and sent as a group to save battery power (e.g. send the last 10 samples every 1000 seconds). The leak detection algorithm may then be run remotely (permitting updates to be applied without needing to reprogram the detectors in the field).

Start of Predetermined Period

The predetermined period during which an embodiment monitors for a leak, e.g., by monitoring to detect a below threshold temperature difference and/or convergence of pipe and ambient temperature profiles, may have a predetermined duration, e.g. 2.7 hours, beginning at a starting time. The starting time may be determined by detecting a peak in $d^2T/dt^2$, taking into account the sign of this second differential (the term 'differential' being used interchangeably with 'derivative' throughout this specification, for example the second order derivative $d^2T/dt^2$ being referable to as a second derivative/differential of temperature with respect to time). Such a peak may be interpreted as indicating a water usage/flow and may thus be used to trigger the start of a new predetermined period, e.g., to re-start an existing monitoring period. When the second order differential is negative and the pipe temperature is greater than the ambient/air temperature, this may indicate the start of the predetermined period. When the second order differential is positive and the pipe temperature is less than the air temperature, this may similarly start a predetermined period.

Additional or Alternative Leak Detection

One method of leak detection involves using a determination of temperature difference between pipe and ambient air sensors and determining if the temperature difference is below a pre-determined threshold for a predetermined period, as described elsewhere in this specification. However, depending for example on the time of year and/or a local climate, the temperature of the pipe may not be substantially constant throughout a period of no flow. Consequently, additionally or alternatively to the above method, an embodiment may determine a leak/no leak state based on whether or not the pipe temperature and ambient temperature tend to converge (as opposed to, e.g., 'tracking', i.e., generally staying parallel with a constant or zero offset).

Generally, in a no flow (e.g. no leak) condition, the pipe and ambient air temperatures may tend to gradually converge. In a flow or leak condition, the pipe temperature may tend to a constant temperature without returning to or at least converging towards the ambient temperature; this may even involve the pipe temperature crossing the ambient temperature.

In one scenario, in the no flow condition, the pipe temperature may gradually drop or rise depending on the environment so that the temperature difference between the ambient and pipe temperature sensors generally reduces. Bearing this in mind, it may be advantageous for detecting a leak to monitor the progression of the pipe and/or ambient temperature relative to each other, for example by monitoring progression of a gradient of temperature vs time of at least the pipe temperature. Such monitoring may allow early detection of a leak without awaiting detection of a sufficiently low and/or constant temperature difference between the sensors, e.g., without waiting to see if the pipe and ambient temperatures track and/or become closer than a threshold difference apart.

Thus, a preferred embodiment, additionally or alternatively to the monitoring of the temperature difference relative to a threshold, may monitor whether or not the pipe temperature tends to converge towards the ambient temperature, when there has been no other water usage for a length of time (for example 5 minutes). Detecting such a lack of water usage may be done by monitoring the second differential of the pipe temperature relative to time (i.e., $d^2T_p/dt^2$), and waiting for it to be below a certain threshold, indicating no sudden changes in temperature and hence no changes in flow due to taps switching off and on or other intermittent usage. To monitor for convergence, an embodiment may monitor the pipe and air temperatures based for example on the equations below.

The rate of change of the measured local pipe temperature can be considered to be:

$$dTp/dt = h1 \cdot (Ta-Tp) + h2(Tw-Tp) \qquad (1)$$

wherein Tp is the pipe temperature, Ta is the ambient temperature and Tw is the temperature of the water entering the pipe from the mains supply, h1 may be considered a (generally constant) transfer coefficient between the pipe and the ambient (e.g. air), and h2 may be considered to be a flow-dependent (thus, may be non-constant) transfer coefficient between the pipe and mains water supply.

h2 may be strongly dependent upon the rate of flow of the water in the pipe, q. If q is zero (no leak), then h2 will be very close to zero. If q is non-zero, then h2 may start to affect, and/or have a greater effect on, dTp/dt.

If there is flow through the pipe, then the coefficient of heat transfer between the water and the pipe, h2 may be larger relative to h1. Over a period of time (typically 5 mins to 3 hours), Tp will generally tend towards Tw. As Tp approaches Tw, the rate of change of Tp, dTp/dt may be small, even if there is still a relatively large difference between the air temperature and the pipe temperature (Ta−Tp). This may be indicative of flow in the pipe and presence of a leak.

One embodiment of implementing this in practice is as follows:
Rearranging (1) for h1 gives $$h1=[(dTp/dt)-h2(Tw-Tp)]/(Tp-Ta) \quad (2)$$

When h2 is large, (1) shows that generally Tp will tend towards Tw over time as Tp will asymptotically approach the water temperature. Tp may approach a steady state as the h2(Tw−Tp) term becomes smaller, and we can then approximate (2) based on the observables Tp and Ta as $$h1'=(dTp/dt)/(Tp-Ta) \quad (3)$$

If h1' is small, then the gradient in the pipe temperature over time is small relative to the difference between the pipe and the ambient/air temperatures. The pipe temperature may then be not tending towards the ambient/air temperature in a way which would be expected under a no leak condition, i.e., there may be an additional heat source or sink being applied to the pipe, potentially indicating the presence of flow in the pipe and thus a leak.

Thus, if it is detected that $$(dTp/dt)/(Tp-Ta)<\text{THRESH} \quad (4a)$$

over a period of several minutes to a few hours, this may be interpreted as indicating a leak, where THRESH is a value that is preferably close to zero but sufficient to allow for variations due to noise and/or water temperature changes.
And if $$(dTp/dt)/(Tp-Ta)>=\text{THRESH} \quad (4b)$$

then this may be interpreted as indicating that there is not a leak. Example values of THRESH may be, e.g., 0.001, 0.005, 0.01, 0.1 or 1.

In an embodiment, rather than calculating the first differential dTp/dt by calculating the difference between $Tp_n$ and $Tp_{n-1}$ where $Tp_n$ and $Tp_{n-1}$ are the values of Tp in successive time periods (which calculation may amplify any noise in the readings), exponential function(s) may be fitted (e.g., finding a best fit for example by means of a least squares fitting method) to the Tp and/or Ta samples over a region in which there has been no previously calculated water usage (this may have been indicated by other means). The exponential function(s) may then be used to calculate a value indicative of dTp/dt by analytical differentiation of the fitted exponential. Each fitted exponential function for the pipe and air temperature may be of the form $a+bt+ce^{dt}$ where a, b, c and/or d are generally taken to be constants and t is an indicator of time. In this case analytical differentiation of the function may calculate the value indicative of dTp/dt by calculating $b+cde^{ct}$.

Advantageously, the use of an equation above, e.g., (3), (4a) and/or (4b), may allow an early and/or fast response to a leak condition.

In an embodiment, leak detection based on a ratio such as in equation (4a) and/or (4b) may be combined with an above described detection method based on detecting when a temperature difference is below/not below a predetermined threshold for a predetermined period. For example, they may run in parallel to provide redundancy and/or to improve robustness. If either algorithm predicted a leak a number (1 or more) of times then a leak could be reported for example by outputting an alarm.

To further understand an embodiment implementing a method of leak detection, consider first a situation where generally there is no influence on pipe temperature $T_p$ other than the ambient temperature $T_a$: for example, there is no leak. In this case:

$dT_p/dt$ is proportional to $T_p-T_a$

If the pipe is cooling, then $dT_p/dt$ is negative; if the pipe is warming, $dT_p/dt$ is positive. Thus:

$$dT_p dt = \frac{-Ah}{M_{cp}}(T_p - T_a)$$

where Ah is a constant relating to a contact area between the pipe and fluid (e.g., water) and Mcp is a constant relating to a mass of the pipe and water mass, i.e., Ah/Mcp may be regarded as a heat transfer coefficient b.

If we consider the general mathematical relationship:

$$dy/dt=-by; \quad y=y_o e^{-bt}$$

where y is a function of time t then $y=T_p-T_a$ would mean that:

$$T_p(t)-T_a=(T_o-T_a)e^{-bt}$$

$$k = \frac{Ah}{M_{cp}} = b$$

where so that:

$$T_p(t)-T_a=(T_o-T_a)e^{-bt}$$

i.e., $$T_p(t)=T_a=(T_o-T_a)e^{-bt}$$

where $T_O$ is the initial temperature of $T_p$ at t=0.

The above 'no other influence' scenario can be used to understand the following using a term F=bF' to reflect the presence of a leak.

Assume that:

$$dT_p/dt=-b(T_p-T_a)+bF'$$

where bF' is negative is the leak causes the pipe to cool, and positive is the leak causes the pipe to warm. then:

$$dT_p/dt=-b(T_p-T_a-F') \quad (5)$$

Using a temperature term x including temperature effect F':

$$x=T_p-(T_p+F')$$

then:

$$x=T_p-(T_a+F')=[T_o-(T_a+F')]e^{-bt}$$

which can be rewritten to give:

$$Tp(t)=(T_a+F')+[T_o-(T_a+F']e^{-bt}$$

F' may be considered to represent a leak, expressed here as an effective reduction in ambient temperature. Thus, determining whether F is large or small may indicate the presence or absence of a leak.

From (5):

$$dT_p/dt = -b(T_p - T_a) + F$$

Thus:

$$F = dT_p/dt + b(T_p - T_a)$$

If:

$$dT_p/dt + b(T_p - T_a) > \text{THRESH} \quad (6a)$$

then this may indicate the presence of a leak, where THRESH is a predetermined threshold.

Conversely, if:

$$dT_p/dt + b(T_p - T_a) <= \text{THRESH} \quad (6b)$$

then this may indicate the absence of a leak.

In this way, the observables $T_p$ and $T_a$ can be used to determine presence and/or absence of a leak. Example values of THRESH may be, e.g., 0.001, 0.005, 0.01, 0.1 or 1.

In view of the above, to implement leak detection, a leak detector for detecting a leak in a water supply system comprising a pipe may have a first temperature sensor detecting ambient temperature, a second temperature sensor configured to be mounted adjacent or in thermal contact with a pipe of the pipe system, and a processing means configured to determine a temperature difference between the first and second temperature sensors, wherein the processing means is configured to indicate the presence of a leak if a monitored variable is above a predetermined threshold for a predetermined period, wherein the monitored variable is the sum of an indicator of time gradient of the sensed pipe temperature and a multiple of the temperature difference, where the multiple represents a constant heat transfer coefficient. The leak detection method based on such a sum may be combined with either or both of the two methods based on the temperature difference relative to a predetermined threshold and on h1'. Furthermore, optional features provided for either of those two methods, for example with regarding to identifying the starting point for the predetermined period, etc., may be applied for this sum-based method similarly.

In an embodiment, leak detection in line with equation (6a) and/or (6b) may be combined with an above described detection method based on detecting when a temperature difference is below/not below a predetermined threshold for a predetermined period and/or with a detection method based on a ratio as in equation (4a) and/or (4b). For example, any two or more of these methods may run in parallel to provide redundancy and/or to improve robustness. If either algorithm predicted a leak a number (1 or more) of times then a leak could be reported for example by outputting an alarm.

Generally speaking, the embodiments described herein are implemented indoors, i.e., are attached to a pipe within a property in order to detect leaks. This may be advantageous depending on geographic location, since an outdoor location may require some thermal insulation to prevent the pipe freezing. Such insulation may interfere with monitoring the ambient temperature, depending on the arrangement of sensors.

Regarding further examples of temperature-time traces, the above descriptions of FIGS. 5a, 5b, 6a and 6b further serve to describe FIGS. 8a, 8b, 9a and 9b, respectively, the latter drawings however covering different periods of time.

Figure 10:
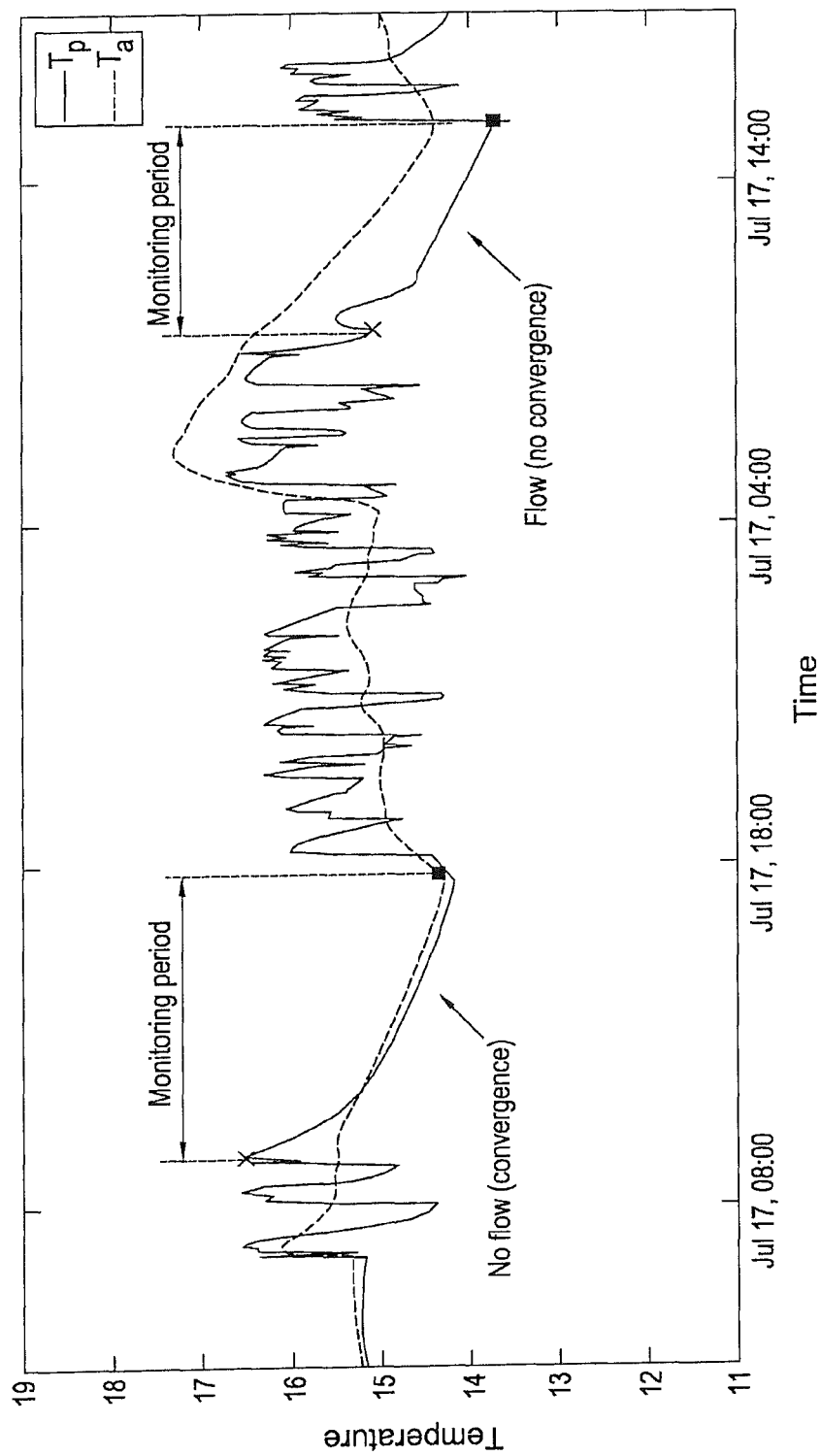
FIGS. 10 and 11 show further examples of temperature-time traces.

FIG. 10 shows further example temperature-time traces of pipe temperature Tp and ambient temperature Ta, including monitoring periods for 'no flow' and 'flow' instances.

Figure 11:
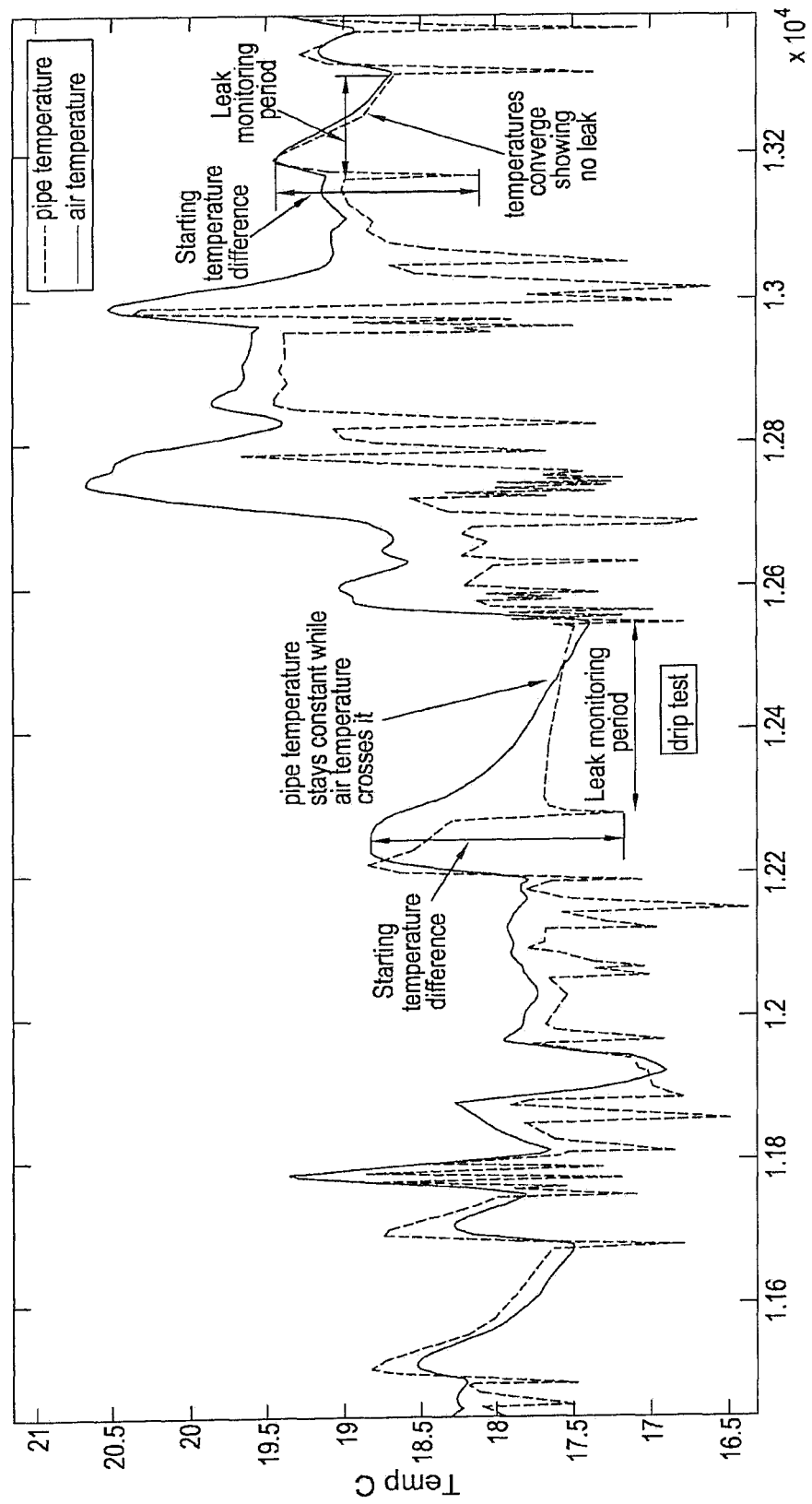

FIG. 11 shows further example temperature-time traces of pipe temperature Tp and ambient temperature Ta. As shown, a maximum ambient/air temperature may be used for a starting temperature difference to trigger a monitoring period. Alternatively, the ambient/air temperature used for the starting difference may be the temperature of the ambient/air at the instant that the pipe temperature curvature is at a maximum.

Figure 12:
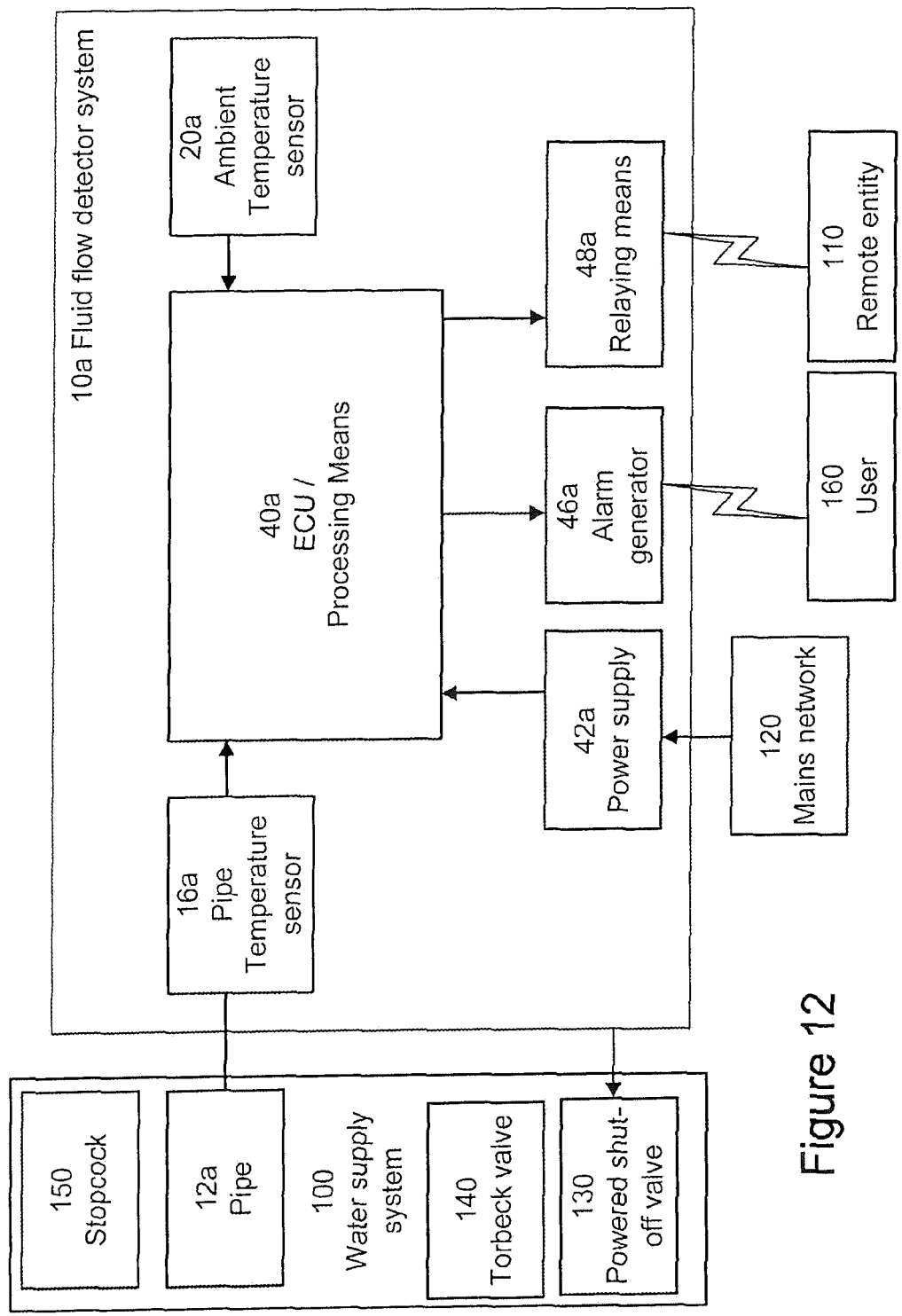
FIG. 12 shows an example implementation of a fluid flow detector system/device.

FIG. 12 shows an example fluid flow detector system 10a, for monitoring a pipe 12a of a water supply system 100. The water supply system may further comprise a stopcock 150, a valve 140 such as a Torbeck valve, and/or a powered shut-off valve 130 which may be controlled for example by the processing means (preferably comprising one or more processors), e.g., ECU 40a. The fluid flow detector system may be a self-contained device for attaching to the pipe 12a, or may comprise a system of couple devices, e.g., the pipe temperature sensor 16a and/or ambient temperature sensor may be provided externally to a device comprising the processing means 40a, e.g., may be coupled by a wire(s) or wirelessly to such a device. The power supply 42a may be coupled to a mains network 120 and/or may comprise a battery(s). The alarm generator 46a is shown in the fluid flow detector system, e.g., in a device housing at least the processing means, however such an alarm generator may additionally or alternatively be provided at a remote entity 110. The alarm generator 46a may send an alarm preferably, wirelessly, to a user 160 and/or to or via a relaying means 48a and/or a remote entity. The fluid flow detector system, e.g., a device comprising at least the processing means, may comprise a relaying means, e.g., a communication interface comprising a transmitter and/or receiver, preferably wireless, for communication with a remote entity 110 (e.g., remote alarm signal receiving station).

Figure 13:
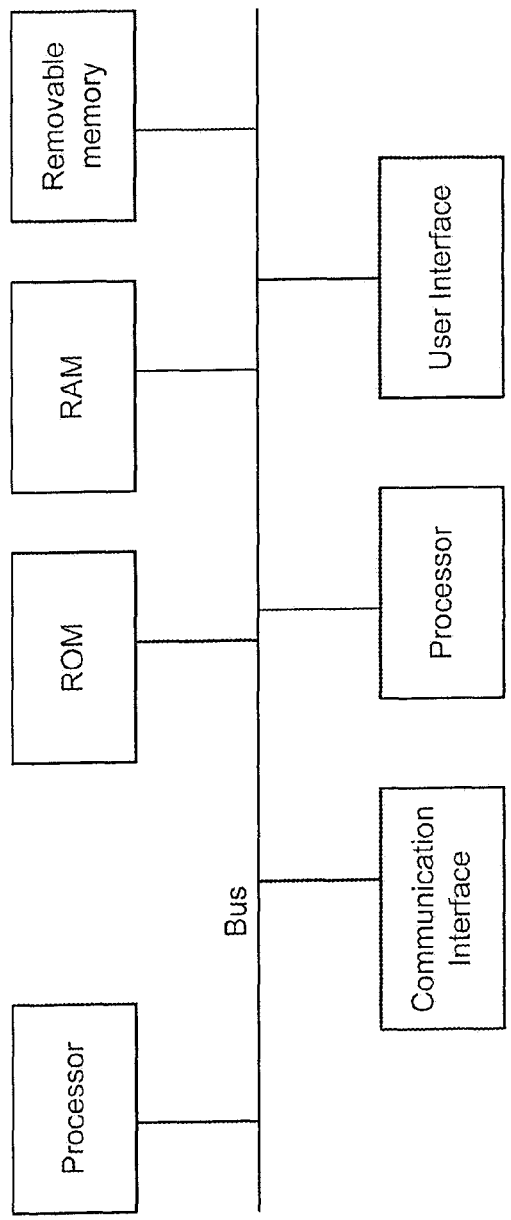
FIG. 13 shows an example computing device or system on which at least the processing means, e.g., electronic control unit, of an embodiment of the invention may be implemented.

FIG. 13 shows an example computing device or system on which at least the processing means, e.g., electronic control unit, of an embodiment of the invention may be implemented. Similarly, remote entity, e.g., remote alarm signal receiving station, may by implemented by such a computing device/system. Each element of FIG. 13 is optional. The computing device/system of FIG. 13 comprises a bus, at least one processor, at least one communication port (e.g., RS232, Ethernet, USB, etc.), and/or memory, all generally coupled by a bus (e.g., PCI, SCSI). The memory may comprise non-volatile memory such as read only memory (ROM) or a hard disk and/or volatile memory such as random access memory (RAM, e.g., SRAM or DRAM), cache (generally RAM) and/or removable memory (e.g., EEPROM or flash memory). The processor may be any known processor, e.g., an Intel (registered trademark) or ARM (registered trademark) processor. A user interface, e.g., display screen and/or keyboard may be provided. The processor 24a may be an ARM® device or a similar processor produced by another manufacturer such as Intel®.

No doubt many other effective alternatives will occur to the skilled person. It will be understood that the invention is not limited to the described embodiments and encompasses modifications apparent to those skilled in the art lying within the spirit and scope of the claims appended hereto.

What is claimed is:

1. An apparatus comprising:
   a timer; and
   a water leak detector for detecting fluid flow in a pipe system, wherein the fluid comprises water, the detector comprising:
   a first temperature sensor detecting ambient temperature;

a second temperature sensor to detect pipe temperature configured to be coupled in thermal contact with a pipe comprising the pipe system;

a processor including circuitry coupled to a memory, wherein the memory comprises one or more instructions and a predetermined threshold value, wherein the processor is configured to execute the instructions to determine a temperature difference value between the first and the second temperature sensors and to detect a leak based on the temperature difference value, wherein in response to the temperature difference value being above the predetermined threshold value for a predetermined period of time measured by the timer, the processor determines that fluid is flowing in the pipe system, and wherein the processor is configured to restart the determination of the predetermined period of time in response to the pipe temperature changing at a rate above a predetermined value, and determine, based on the ambient temperature detection, that the water leak detector is subject to a constant heating or cooling from an external heat source or external heat sink and to indicate a status of an inability to detect if a leak condition is present based on the determination that the water leak detector is subject to the constant heating or cooling.

2. The apparatus according to claim 1, wherein the processor is configured to indicate the status as an alert.

3. The apparatus according to claim 1, wherein the processor is configured to determine whether the detector is subject to heating from a heat source based on stability of the ambient temperature.

4. The apparatus according to claim 1, wherein the processor is configured to, if the temperature difference value is below a predetermined threshold value for a predetermined period, determine that no fluid is flowing in the pipe system.

5. The apparatus according to claim 1, wherein the processor is configured to determine if the temperature difference value between the ambient and pipe sensors is tending to or approximating to an exponential approach to 0, and if so, indicating there is no flow in the pipe system.

6. The apparatus according to claim 1, wherein the processor is configured to rank a water leak rate according to how high the temperature difference value is, thus providing an indication of the severity of the leak.

7. The apparatus according to claim 1, wherein the processor is configured with a 'holiday' mode that can be set by a user determining that no water flow should be expected for a predetermined period, e.g. 72 hours or 14 days, the detector triggering an alert if any water flow is detected in that period.

8. The apparatus according to claim 1, wherein the processor is configured to perform said restart of the determination of the predetermined period of time if the values of the ambient and pipe temperatures change at a rate above the predetermined value.

9. The apparatus according to claim 1, wherein the detector is configured to connect to and control a powered shut-off valve, or allow a user to be able to shut off the water using a remote switch or another interface such as a smart phone app.

10. The apparatus according to claim 1, wherein the processor is further configured to determine that the ambient air temperature is stable within limits, and determine that the water leak detector is not being adversely affected by external heat sources based on the air temperature being stable within the limits.

11. The apparatus according to claim 1, wherein the external heat source is a radiator or a hot water pipe.

12. The apparatus according to claim 1, wherein the processor is configured to indicate a leak detection if the temperature difference is not below a predetermined threshold for the predetermined period, and wherein the processor is configured to indicate a leak of the pipe system, wherein the pipe system is of a domestic building or of an office water supply system.

13. The apparatus according to claim 12, wherein the processor is configured to monitor an indicator of a second order derivative with respect to time of the pipe temperature sensed by the second temperature sensor and to detect if said second order derivative indicator has been below a predetermined value for a predetermined time duration, and wherein the processor is configured to perform, in response to a said detection that said second order derivative indicator has been below a predetermined value for a predetermined time duration, said determining if the temperature difference is not below a predetermined threshold for a predetermined period.

14. The apparatus according to claim 12, wherein the processor is configured to detect when an indicator of a second order derivative of the pipe temperature with respect to time exceeds a predetermined value and to start a said predetermined period in response to a said detection.

15. The apparatus according to claim 12, wherein the processor is configured to vary the predetermined threshold dependent on a said temperature difference at the start of the predetermined period.

16. The apparatus according to claim 12, wherein the processor is configured to determine a time when the pipe should have no flow in the absence of any leak and, if there is any residual temperature difference between the pipe and ambient temperatures at that time, adjust a said predetermined threshold dependent on said residual temperature difference.

17. The apparatus according to claim 12, further comprising an alarm generator to output an alarm in response to at least one said leak detection, the leak detector configured to detect a change in the sensed pipe temperature and to disable the alarm generator until a predetermined number of said changes in the sensed pipe temperature has been detected, wherein the predetermined number is at least one, and wherein the change detection comprises a detection that a pipe temperature change and/or a rate of change of the pipe temperature exceeds a respective predetermined value.

18. The apparatus according to claim 12, further comprising an alarm generator to output an alarm in response to at least one said leak detection, the leak detector configured to detect if the sensed pipe temperature is substantially constant for a predetermined time duration at a temperature that differs from the sensed ambient temperature by more than a predetermined amount and, in response to the detection, immediately trigger the alarm generator to output said alarm.

19. The apparatus according to claim 12, further comprising an alarm generator to output an alarm in response to at least one said leak detection, wherein the processor is configured to detect when a change in the sensed pipe temperature immediately follows a predetermined time duration during which the sensed pipe temperature tracks the sensed ambient temperature, wherein the predetermined time duration preferably comprises at least a predetermined number of 24 hour periods and the predetermined number is at least two, wherein the processor is configured to immediately trigger the alarm generator to output said alarm in response to a said change detection, and wherein the change detection comprises a detection that a pipe temperature change and/or a rate of change of the pipe temperature exceeds a respective predetermined value.

20. The apparatus according to claim 12, further comprising an alarm generator to output an alarm in response to at least one said leak detection, wherein the processor is configured to detect a crossing point of the sensed pipe temperature and the sensed ambient temperature, and to disable the leak alarm generator when such a crossing point is detected.

* * * * *